(12) United States Patent
Wood et al.

(10) Patent No.: US 10,129,230 B2
(45) Date of Patent: *Nov. 13, 2018

(54) SYSTEM FOR KEY EXCHANGE IN A CONTENT CENTRIC NETWORK

(71) Applicant: Cisco Technology, Inc., San Jose, CA (US)

(72) Inventors: Christopher A. Wood, San Francisco, CA (US); Marc E. Mosko, Palo Alto, CA (US); Ersin Uzun, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/690,485

(22) Filed: Aug. 30, 2017

(65) Prior Publication Data

US 2017/0366526 A1 Dec. 21, 2017

Related U.S. Application Data

(63) Continuation of application No. 14/927,034, filed on Oct. 29, 2015, now Pat. No. 9,794,238.

(51) Int. Cl.
*H04L 29/06* (2006.01)
*H04L 9/08* (2006.01)
*H04W 12/04* (2009.01)

(52) U.S. Cl.
CPC .......... *H04L 63/061* (2013.01); *H04L 9/0861* (2013.01); *H04L 63/0807* (2013.01);
(Continued)

(58) Field of Classification Search
CPC ............. G06F 21/6227; H04L 63/0428; H04L 63/0442; H04L 63/045; H04L 63/06; H04L 63/061; H04L 63/10; H04L 67/2842

See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Joseph P Hirl
*Assistant Examiner* — Sayed Aresh Beheshti Shirazi
(74) *Attorney, Agent, or Firm* — Edell, Shapiro & Finnan, LLC

(57) ABSTRACT

One embodiment provides a system that facilitates secure communication between computing entities. During operation, the system generates, by a content-consuming device, a first key based on a first consumer-share key and a previously received producer-share key. The system constructs a first interest packet that includes the first consumer-share key and a nonce token which is used as a pre-image of a previously generated first nonce, wherein the first interest has a name that includes a first prefix, and wherein the first nonce is used to establish a session between the content-consuming device and a content-producing device. In response to the nonce token being verified by the content-producing device, the system receives a first content-object packet with a payload that includes a first resumption indicator encrypted based on a second key. The system generates the second key based on a second consumer-share key and the first content-object packet.

20 Claims, 15 Drawing Sheets

(52) U.S. Cl.
CPC ...... *H04L 63/0853* (2013.01); *H04L 63/0876* (2013.01); *H04W 12/04* (2013.01)

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 * | 1/2004 | Kaplan ................. G06F 9/542 |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,337 B2 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 * | 2/2013 | Jacobson ............. H04L 67/104 709/219 |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,903,756 B2 | 12/2014 | Zhao |
| 8,934,496 B2 | 1/2015 | Vasseur |
| 8,937,865 B1 | 1/2015 | Kumar |
| 9,071,498 B2 | 6/2015 | Beser |
| 9,112,895 B1 | 8/2015 | Lin |
| 9,313,030 B2 * | 4/2016 | Ravindran ............. H04L 9/3247 |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 * | 12/2002 | Yang ..................... H04L 29/06 709/238 |
| 2003/0033394 A1 | 2/2003 | Stine |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0071140 A1 | 4/2004 | Jason |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |

(56) References Cited

U.S. PATENT DOCUMENTS

| | | |
|---|---|---|
| 2005/0262217 A1 | 11/2005 | Nonaka |
| 2005/0281288 A1 | 12/2005 | Banerjee |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1* | 11/2007 | Li .................. H04L 67/306 709/201 |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010386 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0144300 A1 | 6/2009 | Chatley |
| 2009/0157887 A1 | 6/2009 | Froment |
| 2009/0135746 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1* | 11/2009 | Jacobson .............. G06F 15/173 726/22 |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |

(56) References Cited

U.S. PATENT DOCUMENTS

| | | |
|---|---|---|
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0223237 A1 | 3/2013 | Hui |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0232920 A1 | 10/2013 | Zhang |
| 2013/0282854 A1 | 10/2013 | Jang |
| 2013/0282860 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108474 A1 | 4/2014 | David |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis .............. H04L 67/327 709/204 |
| 2014/0289790 A1 | 9/2014 | Wilson |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0188770 A1 | 7/2015 | Naiksatam |
| 2015/0195149 A1 | 7/2015 | Vasseur |
| 2015/0207633 A1* | 7/2015 | Ravindran ........ H04L 9/3247 713/176 |
| 2016/0192186 A1* | 6/2016 | Lin .................. H04W 12/04 380/270 |
| 2016/0286393 A1* | 9/2016 | Rasheed ........... H04L 9/3215 |
| 2017/0126643 A1 | 5/2017 | Wood et al. |

FOREIGN PATENT DOCUMENTS

| | | |
|---|---|---|
| EP | 0295727 A2 | 12/1938 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007144388 A1 | 12/2007 |

(56) References Cited

FOREIGN PATENT DOCUMENTS

| WO | 2011049890 A1 | 4/2011 |
|---|---|---|
| WO | 2007113180 A1 | 10/2011 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/, downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Muitilevel Adaptive Hashing", Jan. 1990, pp. 43-53.
Detti, Andrea, et al. "CONET: a content centric inter-networking architecture." Proceedings of the ACM SIGCOMM workshop on Information-centric networking, ACM, 2001.
A. Wolman, M. Voelker, N. Sharma N. Cardwell., A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choltries, Aleksandar Kuzmanovíc, and Fabian E. Bustamante, Drafting Behind Akamal: Inferring Network Conditions Based on CDN Redirections. IEEE/ACM Transactions on Networking (Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc.downloaded Apr. 27, 2015.
Bari, MdFaizul, et al. 'A survey of naming and routing in information-centric networks,' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHOPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga Antonío, Matthew J. Rutherford, and Alexander I. Wolf 'A routing scheme for content-based networking,' INFOCOM 2004 Twenty-third Annual Joint Conference of the IEEE Computer and Communication Societies vol. 2, IEEE, 2004.
Cho, Jin-Hee, Ananthram Swami, and Ray Chen. "A survey on trust management for mobile ad hoc networks," Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org.releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin, Identity Based Encryption from the Weil Pairing. Advances in Cryptology—CRYPTO 2001, vol. 2139, Springer Berlin Heidelberg (2001).
D.K. Smetters, P. Golle, and J.D. Thornton. "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations' Information Processing Letters 11.1 (1980): 1-4.
Dijkstra, Edsger W., Wim HJ Feijen, and A_J M. Van Gasteren, "Derivation of a termination detection algorithm for distributed computations." Control Flow and Data Flow: concepts of distributed programming, Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tooloonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158), ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage service," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review, vol. 19, No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, Gene Tsudik, and Ersin Uzun, "Needle in a Haystack: Mitigating Content Poisoning in Named-Data Networking." Proceedings of NDSS Workshop on Security of Emerging Networking Technologies (SENT). 2014.

(56) References Cited

OTHER PUBLICATIONS

Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 2004.
Xiong et al., "CloudSeal: End-to-End Content Protection in Cloud-based Storage and Delivery Services", 2012.
Herckerman, David, John S. Breese, and Koos Rommelse. "Decision-Theoretic Troubleshooting," Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2010).
Hoque et al. 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwal, Chaiormek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009, ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems," Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley, "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on ecrypted data in cloud storage," IEEE Trans. Inf. Forensics Security, vol. 8, No. 12, pp. 1947-1960, Dec. 2013.
Li, Wenjia, Anupam Joshi, and Tim Finin, "Coping with node misbehaviors in ad hoc networks: A multi-dimensional trust management approach," Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes." in Proc, FC 2000, Anguilla, British West Indies, Feb. 2000, pp. 1-20.
M. Nystrom, S. Parkinson, A. Rusch, and M. Scott, "PKCS#12: Personal Information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JASC, Apr. 1997.
M. Walfish, H. Balakrishnan, and S. Shenker, "Untangling the web from DNS," in. Proc. USENIX NDSI 2004, Oct. 2010, pp. 735-737.
Mahadevan, Priya, et al. "Orbis: rescaling degree correlations to generate annotated internet topologies," ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-date.net/, Downloaded Mar. 9, 2015.
Omar, Mawloud, Yacine Challaf, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen, Chosen-Ciphertext Secure Proxy Re-Encryption without Pairing. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng, Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-are multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.

(56) References Cited

OTHER PUBLICATIONS

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Determining and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012, Located online at http://www.sandvine.com/donloads/ documents/Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Sichen, Jeffrey, and Steven T. Bushby. A Simulation Study of a Hierarchical, Run-Based Method for System-Level Dault Detection and Diagnostics in HVAC Systems, US Department of Commerce,[Technology Administration], National Institute of Standards and Technology, 2005.

Shani, Guy, Joelle Pineau, and Robert Kaplow. "A survey of point-based POMDP solvers," Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 2.34 (2007): 309-322.

Shih, Eugene et al., 'Wake on Wireless: An Event Driven Energy Saving Strategy for Battery Operated Devices', Sep. 23, 2002, pp. 160-171.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments,' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B. G., Chun, A. Ermolinskiy, K.H. Kim, S. Shenker, and I. STOICA, 'A data-oriented (and beyond) network architecture.' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahal, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Miniconference (2012).

Verma, Vandi, Joquin Fernandez, and Reid Simmons, "Probabalistic models for monitoring and fault diagnosis." The Second IARP and IEEE/FAS Joint Workshop on Technical Challengers for Dependable Robots in Human Environments. Ed. Raja Chatila. Oct. 2002.

Vijay Kumar Adhikari, Yang Guo, Fang Hao, Matteo Varvello, Volker, Hilt, Mortiz Steiner, and Zhi-Li Zhang, Unreeling Netflix: Understanding and Improving Multi-CDN Movie Delivery. In the Proceedings of IEEE INFOCOM 2012 [2012].

Vutukury, Srinivas, and J. J. Garcia-Luna-Aceves. A simple approximation to minimum-delay routing, vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding place.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001. PARC Tech Report.

Zhang, Lixia, et al. 'Named data networking.' ACM SIGCOMM Computer Communication Review 44.3 (2014): 66-73.

J. Lotspiech, S. Nusser, and F. Pestoni. Anonymous Trust: Digit. RTMP (2009). Available online at http://wwwimages.adobe.com/www.adobe.com/content/dam/Adobe/en/devnet/rtmp/ pdf/rimp specification 1.0.pdf.

S. Kamara and K. Lauter. Cryptographic Cloud Storage. Financial Cryptography and Data Security. Springer Berlin Heidelberg (2010).

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishlyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

(56) References Cited

OTHER PUBLICATIONS

Wetherall, David, "Active Network vision and reality: Lessons from a capsule-based system", ACM Symposium on Operating Systems Principles, Dec. 1, 1999, pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Extended European Search Report in counterpart European Application No. 16193824.6, dated Mar. 23, 2017, 7 pages.

Burke, et al., "Securing Instrumented Environments over Content-Centric Networking: the Case of Lighting Control and NDN," IEEE INFOCOM 2013 Workshop on Emerging Design Choices in Name-Oriented Networking, Apr. 2013, 6 pages.

Dibenedetto, et al., "ANDaNA: Anonymous Named Data Networking Application," NDSS Symposium 2012, Feb. 2012, 18 pages.

Rescorla, "The Transport Layer Security (TLS) Protocol Version 13," draft-ietf-tls-tls13-10, Network Working Group, Internet Draft, Standards Track, Oct. 19, 2015, 103 pages.

Mosko, et al., "CCNz Key Exchange Protocol Version 1.0," draft-wood-icnrg-ccnxkeyexchange-00, icnrg, Internet Draft, Experimental, Jul. 8, 2016, 27 pages.

\* cited by examiner

| TAG 502 | DESCRIPTION 504 | OPTIONAL 506 |
|---|---|---|
| CCS 502.1 | Compressed certificate set that the consumer possesses, which is used for generating authenticators by the producer | No |
| CCRT 502.2 | Cached certificates in the consumer's possession | No |
| VER 502.3 | Supported CCNxKE protocol version(s) | No |
| PROOF 502.4 | Proof of demand (i.e., a sorted list of types of proof that the consumer will expect) | Yes |
| NONCE1 502.5 | A 32-byte hash digest computed over a random input NONCE-TOKEN (used later) using SHA-256 | No |

| TAG 512 | DESCRIPTION 514 | OPTIONAL 516 |
|---|---|---|
| {REJ} 512.1 | Rejection flag or token | No |
| {REASON} 512.2 | Reason for rejection | No |
| CONFIG 512.3 | Configuration information for the producer | Yes |
| NONCE2 512.4 | An optional 32-byte nonce to use for the following message in the CCNxKE instance | Yes |
| PSALT1 512.5 | An optional, producer-side salt to use when deriving the short-term secret ("SS") key | Yes |
| PREFIX2 512.6 | An optional CCNxName prefix to use when continuing the session establishment protocol in Round 2 | Yes |

510

NOTE 511: {x} denotes a value encrypted with the short-term secret ("SS") key

FIG. 5B

| TAG 522 | DESCRIPTION 524 | OPTIONAL 526 |
|---|---|---|
| SCID 522.1 | Server/producer configuration identifier | Yes |
| KEXS 522.2 | Supported elliptic-curve key-exchange algorithms | No |
| AEAD 522.3 | Supported AEAD algorithms | No |
| PUBS 522.4 | List of public values (for key exchange algorithm) encoded appropriately for the given group | No |
| EXPRY 522.5 | Expiration timestamp (i.e., longevity of the CONFIG structure) | No |
| VER 522.6 | Version of the CONFIG structure | Yes |

FIG. 5C

| TAG 532 | DESCRIPTION 534 | OPTIONAL 536 |
|---|---|---|
| CLIENT-SHARE1 532.1 | Client public share for the initial DH exchange | No |
| CSALT1 532.2 | Client salt for the initial DH exchange and SS generation | Yes |
| PSALT1 532.3 | Echoed producer salt (not optional if the producer provided one) | Yes |
| PROOF 532.4 | Proof of demand (a sorted list of types of proof that the client will expect) | No |
| {CCS} 532.5 | Compressed certificate set that the client possesses | No |
| {CHALLENGE} 532.6 | A random 32-byte challenge that is to be signed by the producer | No |
| {CHOICE} 532.7 | Algorithm (KEXS and AEAD) options choice (a list of tags echoed from the CONFIG) | No |
| {NONCE-TOKEN} 532.8 | The pre-image of NONCE1 such that SHA-256(NONCE-TOKEN) = NONCE1 | No |
| {CLIENT-SHARE2} 532.9 | Second client public share for generating the ephemeral key (FSK) | No |
| {CSALT2} 532.10 | Client salt for generating the FSK | Yes |

NOTE 531: {x} denotes a value encrypted with the short-term secret ("SS") key

FIG. 5D

| TAG 542 | DESCRIPTION 544 | OPTIONAL 546 |
|---|---|---|
| SessionID 542.1 | Cleartext session identifier | No |
| [RC] 542.2 | Resumption cookie | Yes |
| {ACK} 542.3 | Positive ACK flag indicating success | No |
| {RESPONSE} 542.4 | The signed output of the CHALLENGE according to the PROOF preferences and CCS certificates in possession of the consumer | No |
| {PSALT2} 542.5 | 32-byte producer salt for the FSK key exchange | Yes |
| {SERVER-SHARE2} 542.6 | Server's second public key share for generating the FSK | No |
| {(Prefix3, MoveToken)} 542.7 | Third prefix and token to use when moving to session establishment | Yes |

540

NOTE 541: {x} denotes a value encrypted with the short-term static ("SS") key, and
[y] denotes a value encrypted with the forward secure key ("FSK")

FIG. 5E

US 10,129,230 B2

SYSTEM FOR KEY EXCHANGE IN A CONTENT CENTRIC NETWORK

RELATED APPLICATIONS

This application is a continuation of U.S. patent application Ser. No. 14/927,034, filed Oct. 29, 2015, entitled "SYSTEM FOR KEY EXCHANGE IN A CONTENT CENTRIC NETWORK," the subject matter of which is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. Pat. No. 8,386,622, entitled "METHOD AND APPARATUS FOR FACILITATING COMMUNICATION IN A CONTENT CENTRIC NETWORK," by inventor Van L. Jacobson, filed 11 Dec. 2008 (hereinafter "U.S. Pat. No. 8,386,622");

U.S. Pat. No. 8,204,060, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009 (hereinafter "U.S. Pat. No. 8,204,060"); and U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013 (hereinafter "U.S. patent application Ser. No. 14/065,691"); the disclosures of which are herein incorporated by reference in their entirety.

BACKGROUND

Field

This disclosure is generally related to distribution of digital content. More specifically, this disclosure is related to a system for facilitating secure communication between entities in a content centric network based on a key exchange protocol.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content-object packets in return. CCN interests and content objects are identified by their unique names, which are typically hierarchically structured variable length identifiers (HSVLI). An HSVLI can include contiguous name components ordered from a most general level to a most specific level.

In an IP-based communication such as TCP and UDP, two communicating entities can establish a secure session and verify subsequent messages based on their individual respective IP addresses. In contrast, communication in a CCN is not based on IP addresses. Instead, a CCN data packet (such as an interest or content object) is routed based on the name for the packet. Thus, entities communicating within a CCN cannot rely on IP addresses to securely establish an ephemeral session and exchange data within the session.

SUMMARY

One embodiment provides a system that facilitates secure communication between computing entities. During operation, the system generates, by a content-consuming device, a first key based on a first consumer-share key and a previously received producer-share key. The system constructs a first interest packet that includes the first consumer-share key and a nonce token which is used as a pre-image of a previously generated first nonce, wherein the first interest has a name that includes a first prefix, and wherein the first nonce is used to establish a session between the content-consuming device and a content-producing device. In response to the nonce token being verified by the content-producing device, the system receives a first content-object packet with a payload that includes a first resumption indicator encrypted based on a second key. The system generates the second key based on a second consumer-share key and the first content-object packet.

In some embodiments, the nonce token is verified based on the first key and the first nonce.

In some embodiments, generating the first key is further based on performing a key derivation function based on the first consumer-share key and the first producer-share key, and generating the second key is further based on performing the derivation function based on the second consumer-share key and a second producer-share key indicated in the first content-object packet. The system also generates, based on performing an expansion function based on the second key, one or more of the following: a consumer-specific second key; a producer-specific second key; a consumer-specific initialization vector; and a producer-specific initialization vector.

In some embodiments, the system constructs an initial interest packet with a name that includes the first prefix and the first nonce, and a payload that indicates an initial hello. In response to the initial interest packet, the system receives an initial content-object packet with a payload that includes configuration information and the second nonce, wherein the configuration information indicates the first consumer-share key, and wherein the second nonce is used to establish the session.

In some embodiments, the payload for the initial content-object packet includes a second prefix different from the first prefix. The system replaces the first prefix with the second prefix in the name for the first interest packet and a name for a subsequent interest packet associated with the session.

In some embodiments, the name for the first interest packet further includes a previously received second nonce, wherein the second nonce is used to establish the session.

In some embodiments, the system constructs a second interest packet with a name that includes a previously received session identifier, and a payload encrypted based on a consumer-specific second key. In response to the second interest packet, the system receives a second content-object packet with a payload encrypted based on a producer-specific second key, wherein the consumer-specific second key and the producer-specific second key are generated based on performing an expansion function on the second key.

In some embodiments, the payload for the first content-object packet indicates a move token and a third prefix different from the first prefix. The system replaces the first prefix with the third prefix in the name for the second interest packet and a name for a subsequent interest packet associated with the session, and indicates the move token in the payload for the second interest packet.

In some embodiments, the payload for the second content-object packet includes a second resumption indicator for a subsequently resumed session between the consumer and the producer.

In some embodiments, the system decrypts the payload for the first content-object packet. In response to determining that the decrypted payload does not indicate a rejection, the system obtains an acknowledgment and a second producer-share key.

Another embodiment provides a system that facilitates secure communication between computing entities. During operation, the system receives, by a content-producing device, a first interest packet that includes a first consumer-share key and a nonce token which is used as a pre-image of a previously received first nonce, wherein the first interest has a name that includes a first prefix, and wherein the first nonce is used to establish a session between a content-consuming device and the content-producing device. The system generates a first key based on the first consumer-share key and a first producer-share key. The system verifies the nonce token based on the first key and the first nonce. The system then generates a second key based on the first interest packet and a second producer-share key. The system also constructs a first content-object packet with a payload that includes a first resumption indicator encrypted based on the second key.

In some embodiments, the system receives an initial interest packet with a name that includes the first prefix and the first nonce, and a payload that indicates an initial hello. In response to the initial interest packet, the system constructs an initial content-object packet with a payload that includes configuration information and a second nonce, wherein the configuration information indicates the first consumer-share key, and wherein the second nonce is used to establish the session.

In some embodiments, the system includes in the payload for the initial content-object packet a second prefix that is different from the first prefix, wherein the name for the first interest packet includes the second prefix, and wherein the second prefix replaces the first prefix. Furthermore, a name for a subsequent interest packet associated with the session includes the second prefix.

In some embodiments, the system generates a session identifier based on the second key. The system receives a second interest packet with a name that includes the session identifier, and a payload encrypted based on a consumer-specific second key. In response to the second interest packet, the system constructs a second content-object packet with a payload encrypted based on a producer-specific second key, wherein the consumer-specific second key and the producer-specific second key are generated based on performing an expansion function on the second key.

In some embodiments, the system indicates in the payload for the first content-object packet a move token and a third prefix different from the first prefix, wherein the name for the second interest packet includes the third prefix in place of the first prefix, and wherein the payload for the second interest packet indicates the move token.

In some embodiments, in response to identifying a need for a new resumption indicator, the system generates a new resumption indicator for use in a subsequently resumed session between the consumer and the producer. The system includes in the payload for the second content-object packet the new resumption indicator encrypted based on the producer-specific second key.

In some embodiments, verifying the nonce token further comprises: decrypting the payload for the first interest packet based on the first key; performing a hash function on the nonce token to obtain a result; and verifying whether the result matches the first nonce.

In some embodiments, in response to determining that the result matches the first nonce, the system includes in the payload for the first content-object packet an acknowledgment and the second producer-share key. In response to determining that the result does not match the first nonce, the system includes in the payload for the first content-object packet a rejection and a reason for the rejection.

BRIEF DESCRIPTION OF THE FIGURES

FIG. 5A illustrates an exemplary payload format for an interest packet that indicates an initial hello, in accordance with an embodiment of the present invention.

FIG. 5B illustrates an exemplary payload format for a content-object packet in response to an initial hello interest packet, in accordance with an embodiment of the present invention.

FIG. 5C illustrates an exemplary format for a data structure that indicates configuration information for a producer, in accordance with an embodiment of the present invention.

FIG. 5D illustrates an exemplary payload format for an interest packet that indicates a full hello to establish a forward secure key for future communication, in accordance with an embodiment of the present invention.

FIG. 5E illustrates an exemplary payload format for a content-object packet in response to a full hello interest packet to establish a forward secure key for future communication, in accordance with an embodiment of the present invention.

In the figures, like reference numerals refer to the same figure elements.

DETAILED DESCRIPTION

Figure 1:
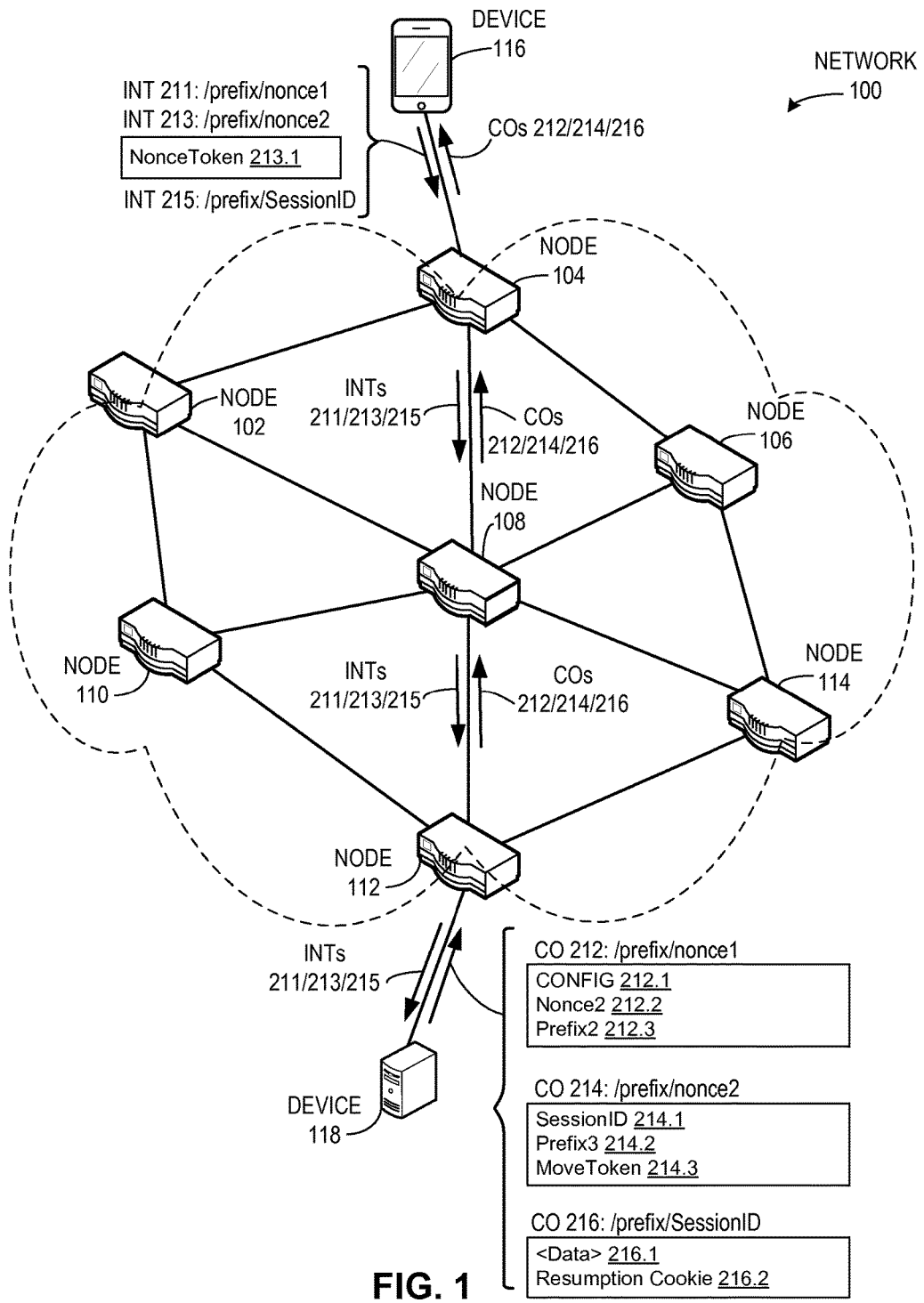
FIG. 1 illustrates an exemplary network facilitating secure communication between computing entities in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which establishes secure session keys for authenticated encryption of data between two entities in a CCN based on a key exchange protocol. In a traditional IP-based communication (e.g., TCP and UDP), two communicating entities can establish a session and verify subsequent communications based on their individual IP addresses. In contrast, in a CCN, communication is not based on IP addresses. A CCN data packet is instead routed based on a packet name. Two communicating CCN entities cannot rely on IP addresses to securely establish an ephemeral session and ensure that subsequent messages belong to the same session.

Embodiments of the present invention address this problem by providing a system which establishes a secure ephemeral session between two CCN entities (e.g., a consumer and a producer) and binds all messages to the secure session based on a key exchange protocol. The protocol provides mutual authentication and establishes a symmetric forward-secure session key ("FSK") which protects the privacy and integrity of communication between the entities. An FSK is a shared, symmetric key derived from a set of short-term and longterm keys in a way that prevents the FSK from being compromised even if one of the long-terms keys is compromised. In other words, an FSK protects past sessions against future compromises of secret keys. Thus, encrypted past communications cannot be retrieved and decrypted even if long-term secret keys are compromised in the future. A detailed description of FSK generation based on short-term and long-term keys is provided below in relation to FIGS. 2A and 5A-5E.

Prior transport network layer protocols based on TCP or UDP over IP include Transport Layer Security (TLS) and Quick UDP Internet Connections (QUIC). TLS is described in Rescorla, E., "The Transport Layer Security (TLS) Protocol Version 1.3," August 2015, and QUIC is described in Iyengar, J. and I. Swett, "QUIC: A UDP-Based Secure and Reliable Transport for HTTP/2," December 2015. Prior TCP-based protocol TLS uses the TCP three-way handshake to provide proof of a single continued message exchange, while prior UDP-based protocol QUIC uses a session address token that must be presented by the consumer to prove ownership of an address during a key exchange procedure. In contrast, embodiments of the present invention provide a reverse hash-chained nonce in an interest name as proof of a single continued message exchange.

The key exchange protocol of the present invention requires at most two round trip times ("RTTs") when an initial bootstrap is required. In some instances, only one RTT may be needed (e.g., when certain bootstrapping has already been performed). The key exchange protocol may also allow for zero RTTs in the case of accelerated starts (e.g., when the information necessary to derive the FSK has previously been exchanged) and session resumption (e.g., when a consumer wishes to subsequently resume an interrupted session). For example, a producer may, at its discretion, generate and provide a new resumption cookie for a consumer to use in a subsequently resumed session, thus enabling a zero RTT session resumption. In addition, the key exchange protocol provides for end-to-end migration and session migration. The end-to-end migration allows a producer to redirect a consumer to a different entity (e.g., to hand off the key exchange to a different service with a different name prefix). The session migration allows a producer to redirect the consumer by transferring an initially established security context to a new service (e.g., to hand off the session security and subsequent content communication to a different service with a different name prefix).

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814, which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is hereby incorporated by reference.

Exemplary Network and Overview of Exemplary Communication

FIG. 1 illustrates an exemplary network 100 facilitating secure communication between computing entities in a content centric network, in accordance with an embodiment of the present invention. Network 100 can include consumer or content-consuming device 116, producer or content-producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106-110). During operation, a consumer (e.g., device 116) can initiate establishment of an ephemeral session with a producer (e.g., device 118) based on a key exchange protocol. A full exchange may require three rounds of communication between the consumer and the producer. In the first round, the entities perform an initial hello exchange to obtain public parameters and configuration information for the producer. The configuration information can include long-term cryptographic material generated by the producer, and is used to generate a first short-term secret key ("SS key"). In the second round, the entities exchange a full hello handshake and establish a forward-secure key ("FSK"). In the third round, the entities may begin exchanging application data encrypted based on the FSK.

A brief overview of each round is described below in relation to FIG. 1, and a detailed description of each round is described below in relation to FIG. 2A. In the first round, consumer 116 can generate an interest 211 with a name of "/prefix/nonce1" and send interest 211 to node 104. Node 104 can add an entry for interest 211 in its pending interest table (PIT), and send interest 211 to nodes 108 and 112, each of which perform similar operations. Node 112 can send interest 211 to producer 118. Producer 118 can determine an initial hello and satisfy interest 211 by sending back a content object 212 with the same name and a payload that includes: a CONFIG 212.1 which is a data structure that contains cryptographic long-term keys for use in creating a first secret key (e.g., the SS key); a nonce2 212.2 which is a second nonce to be used for verification in a subsequent interest for the session; and an optional prefix2 212.3 which can be used to indicate a redirection to another server for subsequent requests. Content object 212 travels the reverse path as interest 211 (e.g., via nodes 112, 108, and 104) back to consumer 116), with each intermediate node updating its PIT accordingly.

In the second round, consumer 116 can generate an interest 213 with a name of "/prefix/nonce2" (which includes nonce2 212.2 previously received from producer 118). Interest 213 can include a NonceToken 213.1 which is the pre-image of the previously generated "nonce1" provided in the name for interest 211. For example, hashing the NonceToken generates nonce1: H(NonceToken)=nonce1. Producer 118 can receive interest 213, verify the NonceToken, and create a content object 214 by generating a SessionID 214.1, and optionally generating a prefix3 214.2 and a MoveToken 214.3. Prefix3 214.2 and MoveToken 214.3 can be used to indicate a migration to another server for authentication of the security context for subsequent data exchanges. Producer 118 can generate the FSK and begin encrypting data based on the FSK, as described below in relation to FIG. 2A. Consumer 116 can subsequently receive content object 214 and also generate the FSK.

In the third round, consumer 116 and producer 118 may begin exchanging application data encrypted based on the FSK. For example, consumer 116 can create an interest with a name of "/prefix/sessionID" (which includes SessionID 214.1 previously received from producer 118) and data encrypted with the FSK. Producer 118 can receive interest 215 and generate a content object 216 which includes data 216.1 encrypted with the FSK. Producer 118 can optionally include in content object 216 a resumption cookie 216.2 for a consumer to use for efficiently resuming a subsequent session.

Detailed Description of Exemplary Communication

Figure 2A:
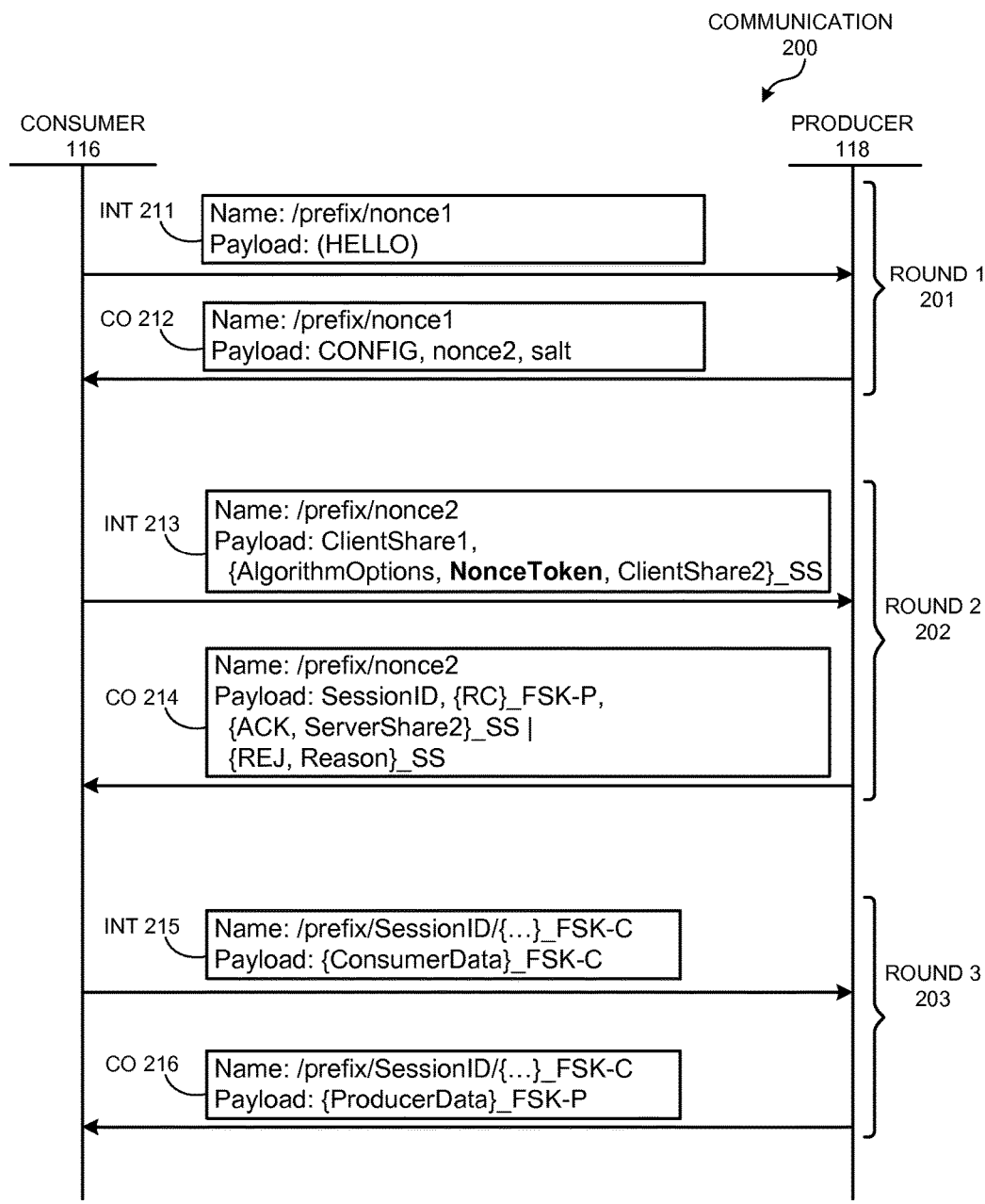
FIG. 2A presents exemplary communication between a consumer and a producer, in accordance with an embodiment of the present invention.

FIG. 2A presents an exemplary communication 200 between a consumer and a producer, in accordance with an embodiment of the present invention. Note that "{x}_KEY" indicates that x is encrypted based on KEY. During operation, a consumer 116 and a producer 118 establish a secure ephemeral session that provides mutual authentication and generates a shared symmetric FSK. Communication 200 includes three rounds of interest packet and content-object packet exchanges: round 1 (201); round 2 (202); and round 3 (203). In round 1, consumer 116 creates an interest 211 with a name of "/prefix/nonce1," where "prefix" is a routable prefix for producer 118 and "nonce1" is a 32-byte hash digest computed over a random input NonceToken (used later) using SHA-256. The payload for interest 211 indicates a hello message. In response to receiving interest 211, producer 118 generates a content object 212 with the same name ("/prefix/nonce1") and a payload with the following data: the configuration file for producer 118 ("CONFIG") which includes the first producer-share key; a "nonce2" which may be used in the following message in the session; and a "psalt" that an optional 32-byte salt to use when deriving the short-term secret ("SS") key. A description of all possible fields for interest 211 and content object 212, respectively, is described below in relation to FIGS. 5A, 5B, and 5C.

Upon receiving content object 212, consumer 116 begins round 2 by generating an interest 213 with a name of "/prefix/nonce2" (where "nonce2" is previously provided by producer 118 in content object 212) and a payload that includes a first consumer-share key ("ClientShare1," for use in generating the SS key) and encrypted consumer parameters, such as: AlgorithmOptions which indicate the algorithm selected by the consumer for use based on the previously received CONFIG file; a NonceToken which is the pre-image of the previously generated "nonce1"; and a second consumer-share key ("ClientShare2") for use in generating the FSK. Consumer 116 generates the SS key based on a key derivation function performed on the first consumer-share key and the first producer-share key (which is included in the CONFIG file), and encrypts the client parameters based on the SS key. The key derivation function can be a hash-based key derivation function (HKDF) as described in Krawczyk, H. and P. Eronen, "HMAC-based Extract-and-Expand Key Derivation Function (HKDF)", RFC 5869, DOI 10.17487, May 2010 (hereinafter "RFC 5869").

Producer 118 receives interest 213 and generates the SS key based on the same key derivation function performed on the first consumer-share key (included as cleartext in the payload of interest 213) and the first producer-share key (in its possession and also included in the CONFIG file). Producer 118 decrypts the client parameters to obtain AlgorithmOptions, NonceToken, and ClientShare2. In some embodiments, producer 118 maintains a mapping of nonce2 to nonce1, and confirms that nonce2 in the received interest 213 corresponds to this mapping. Producer 118 verifies that a hash function performed on NonceToken results in "nonce 1": H(NonceToken)=nonce1. If it does not, producer 118 returns a content object 214 with a rejection and a reason for the rejection. If it does, producer 118 generates the FSK key based on a key derivation function performed on the second consumer-share key (e.g., ClientShare2) and a second producer-share key in its possession (e.g., ServerShare2). Producer 118 further generates a consumer-specific FSK (FSK-C) and a producer-specific FSK (FSK-P) by performing an expansion function on the FSK. For example, the expansion function can be the HKDF-Expand function described in RFC 5869. Producer 118 can encrypt a resumption cookie with the FSK-P and can also generate a session identifier. Producer 118 can include in the payload for content object 214 the resumption cookie encrypted based on the FSK-P as well as an ACK and the second producer-share key encrypted based on the SS key. A description of all possible fields for interest 213 and content object 214, respectively, is described below in relation to FIGS. 5D and 5E.

Finally, upon receiving content object 214, consumer 116 can begin round 3. Consumer 116 can decrypt and obtain the ACK and the second producer share key (ServerShare2) based on the SS key, and subsequently generate the FSK based on the HKDF using the second consumer-share key (ClientShare2) and the obtained second producer-share key (ServerShare2). Consumer 116 can also perform the same expansion function to obtain the FSK-C and the FSK-P. Consumer 116 can then decrypt and obtain the first resumption cookie based on the FSK-P, for later use in a subsequently resumed session. At this point, consumer 116 can generates an interest 215 with a name of "prefix/sessionID/{ . . . }_FSK-C." which includes the session identifier previously received from producer 118 and, optionally, one or more name components encrypted based on the FSK-C. Consumer 116 can further encrypt the payload ("ConsumerData") for interest 215 based on the FSK-C, and send interest 215 to producer 118. Producer 118 can receive interest 215, decrypt the payload (and any encrypted name components) based on the FS K-C, and create a responsive content object 216 with a payload that includes "ProducerData" encrypted based on the FSK-P. Producer 118 can send content object 216 to consumer 116, and consumer 116 can decrypt the payload based on the FSK-P.

Figure 2B:
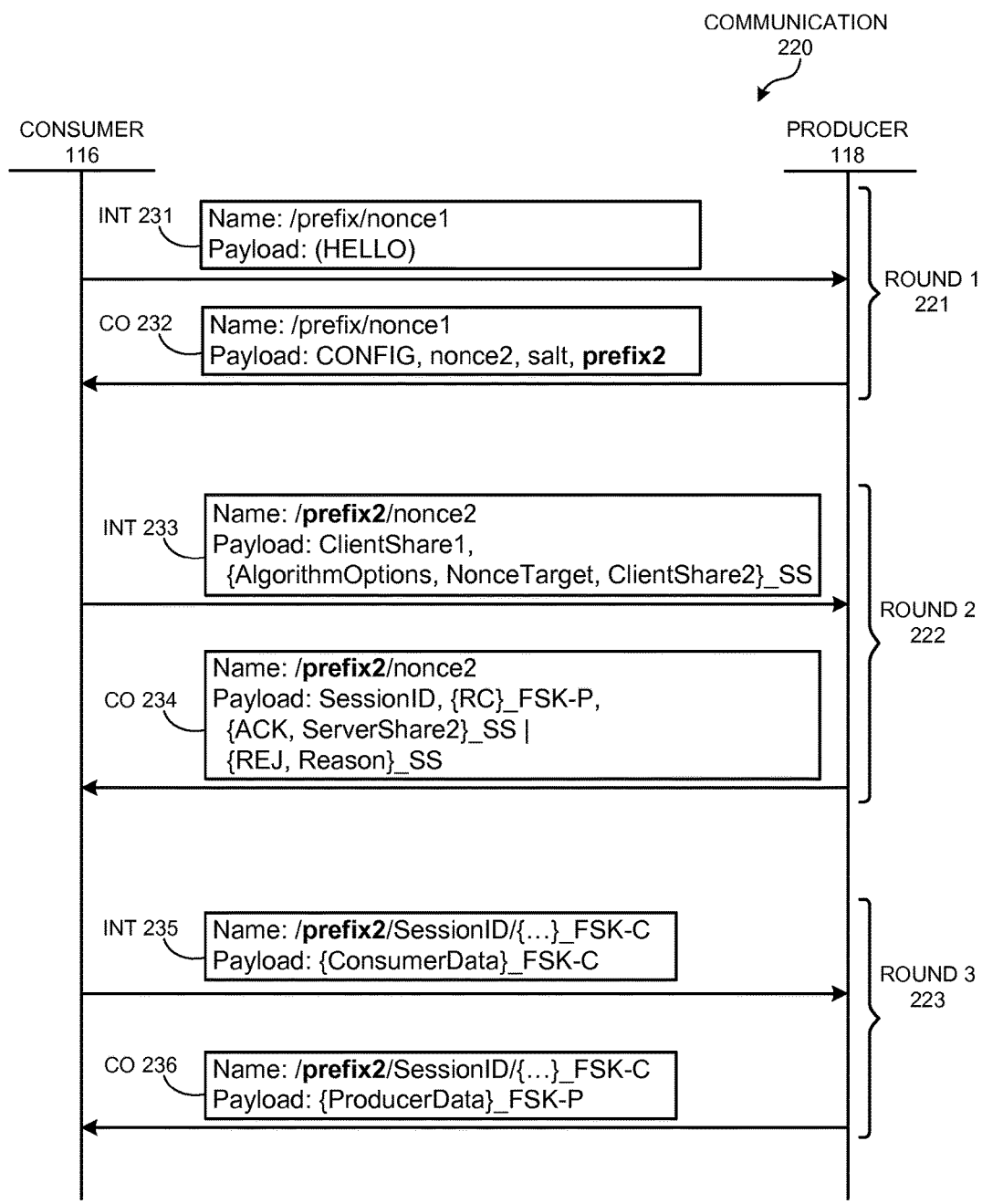
FIG. 2B presents exemplary communication between a consumer and a producer, where the producer provides a redirection prefix, in accordance with an embodiment of the present invention.

FIG. 2B presents an exemplary communication 220 between consumer 116 and producer 118, where the producer provides a redirection prefix, in accordance with an embodiment of the present invention. Communication 220 is similar to communication 200 of FIG. 2A, with differences noted in bold text. During operation, in round 1 (221), in response to receiving an interest 231, producer 118 can determine to migrate the session to a different endpoint. Producer 118 can generate a content object 232 that includes a "prefix2" which is to be used in place of producer 118's routable "prefix" by consumer 116 when continuing the session establishment in round 2 (222). In round 2 and all subsequent rounds (e.g., round 3 (223)), consumer 116 uses "prefix2" as the routable prefix for the producer 118 in, respectively, interest 233 and content object ("CO") 234, and interest 235 and CO 236. Producer 118 redirects consumer 116 to a different prefix, thus allowing for end-to-end migration.

Figure 2C:
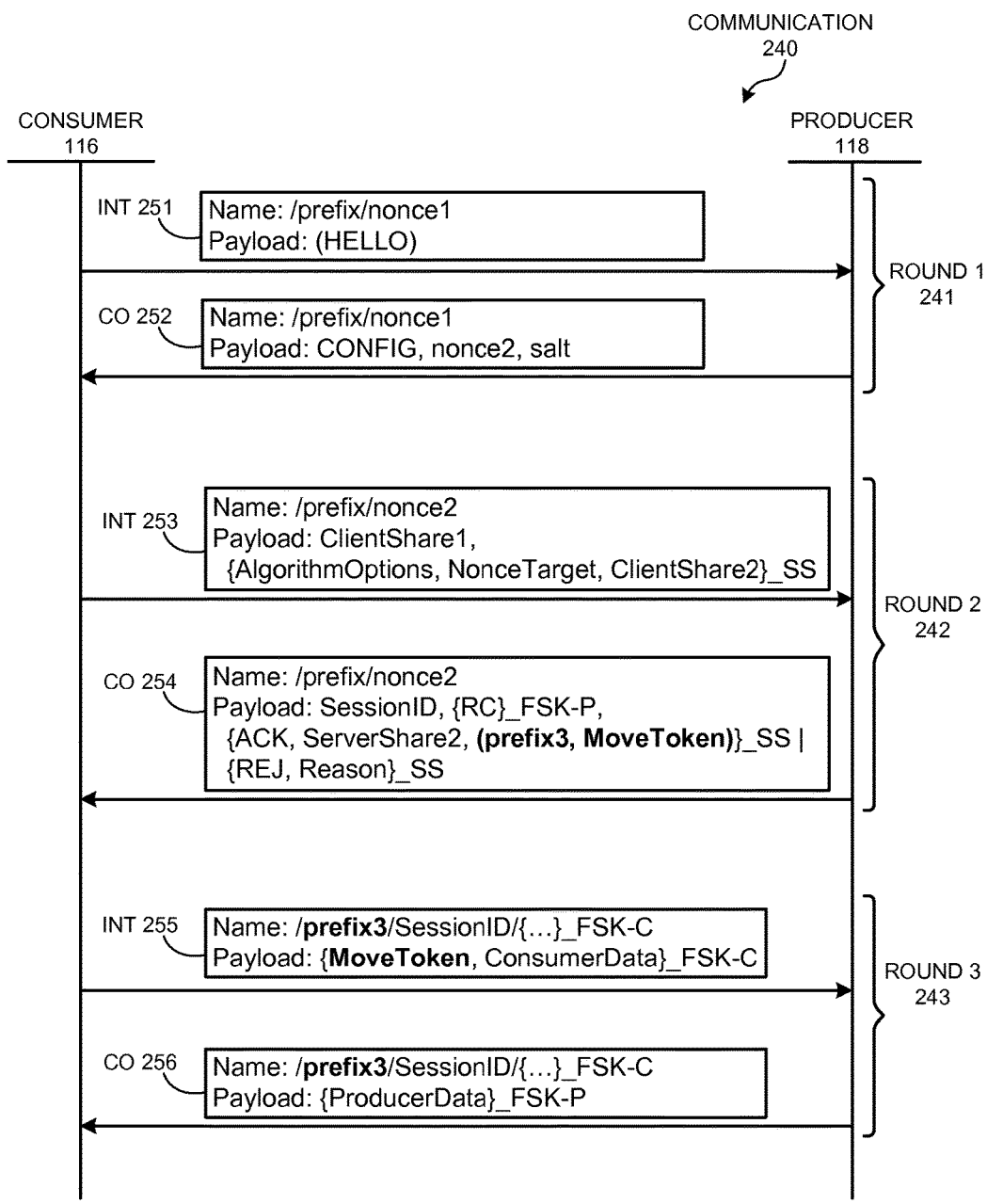
FIG. 2C presents exemplary communication between a consumer and a producer, where the producer provides a session redirection prefix and a move token, in accordance with an embodiment of the present invention.

FIG. 2C presents an exemplary communication 240 between consumer 116 and producer 118, where the producer provides a session redirection prefix and a move token, in accordance with an embodiment of the present invention. Communication 240 is similar to communication 200 of FIG. 2A, with differences noted in bold text. During operation, round 1 (241) (including interest 251 and CO 252) is the same as round 1 (201) of FIG. 2A. In Round 2 (242), in response to receiving an interest 253, producer 118 can determine to transfer the session by handing off the session security to a different content producer peer. Producer 118 can include in the encrypted consumer parameters for content object 254 a "prefix3" to used in place of producer 118's routable "prefix" by consumer 116 when transmitting further interests (e.g., in round 3 (243)). In addition, producer 118 can include a "MoveToken" for consumer 116 to use to provide the necessary security context to the migrated producer peer, as in interest 255 of round 3 (243). Producer 118 redirects consumer 116 to a different prefix and hands off the session to a producer peer after the consumer is authenticated and keying material has been exchanged, thus allowing for session migration.

Figure 2D:
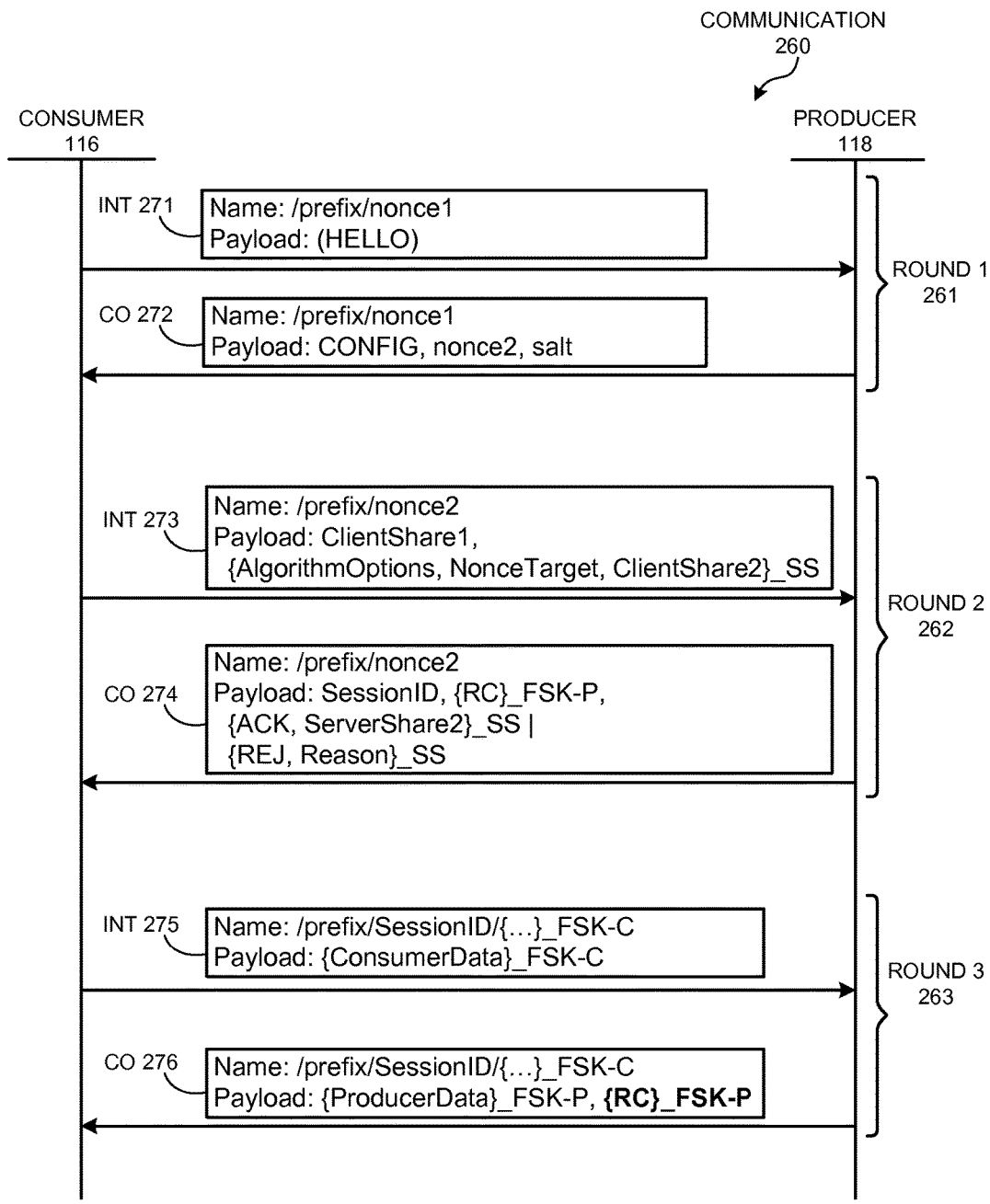
FIG. 2D presents exemplary communication between a consumer and a producer, where the producer provides an updated resumption cookie, in accordance with an embodiment of the present invention.

FIG. 2D presents an exemplary communication 260 between consumer 116 and producer 118, where the producer provides an updated resumption cookie, in accordance with an embodiment of the present invention. Communication 260 is similar to communication 200 of FIG. 2A, with differences noted in bold text. During operation, round 1 (261, including interest 271 and CO 272) and round 2 (262, including interest 273 and CO 274) are the same, respectively, as round 1 (201) and round 2 (202) of FIG. 2A. In Round 3 (263), in response to receiving an interest 275, producer 118 can, at its discretion, determine to generate a new resumption cookie, and include the new resumption cookie in content object 276, encrypted based on the FSK-P. If the session is interrupted (e.g., the web browser is closed or the user's application freezes or is otherwise interrupted), consumer 116 can subsequently resume a session with zero RTT by using the new resumption cookie.

Derivation of SS Key and FSK

The SS key and the FSK can both be derived based on an HKDF, as described in RFC 5869. More specifically, the SS key can be derived as follows:

$$SS = \text{HKDF}(\text{Salt}, IKM) \tag{1}$$

$$\text{Salt} = \text{CSALT1} \parallel \text{PSALT1} \parallel \text{"ss generation"} \tag{2}$$

$$IKM = DH(\text{ClientShare1}, \text{ServerShare1}) \tag{3}$$

The input keying material (IKM) is based on a Diffie-Hellman function that takes as inputs the first consumer-share key (ClientShare1) and the first producer-share key (ServerShare1), and the Salt is a concatenation of the optionally provided first consumer salt (e.g., item 532.2 of FIG. 5D) and first producer salt (e.g., item 512.5 of FIG. 5B and item 532.3 of FIG. 5D) and a fixed string (e.g., "ss generation") in the event that no salts are provided from either the consumer or the producer. The SS key (Equation 1) is therefore a result of the HKDF performed on the Salt (Equation 2) and the IKM (Equation 3).

Furthermore, the FSK can be derived as follows:

$$\text{FSK}=\text{HKDF}(\text{Salt}, IKM) \quad (4)$$

$$\text{Salt}=\text{CSALT2} \mathbin{/\!/} \text{PSALT2} \mathbin{/\!/} \text{"fsk generation"} \quad (5)$$

$$IKM=DH(\text{ClientShare2}, \text{ServerShare2}) \quad (6)$$

In this case, the input keying material (IKM) is based on a Diffie-Hellman function that takes as inputs the second consumer-share key (ClientShare2) and the second producer-share key (ServerShare2), and the Salt is a concatenation of the optionally provided second consumer salt (e.g., item 532.10 of FIG. 5D) and second producer salt (e.g., item 542.5 of FIG. 5E) and a fixed string (e.g., "fsk generation") in the event that no salts are provided from either the consumer or the producer. The FSK (Equation 2) is therefore a result of the HKDF performed on the Salt (Equation 5) and the IKM (Equation 6).

Upon deriving the FSK, a consumer or producer can subsequently derive key material by performing the HKDF-Expand function on the FSK, as described in RFC 5869. The key material is produced from the Expand function in the following order: a consumer-specific write key (FSK-C); a producer-specific write key (FSK-P); a consumer-specific write initialization vector (IV-C); and a producer-specific write initialization vector (IV-P).

Session Identifier and Resumption Cookie

The producer can generate a session identifier ("SessionID") in Round 2 (e.g., as included in content object 214 of round 2 (202) of FIG. 2A). The purpose of the session identifier is to identify a single session for the producer and consumer. The producer may use a random bit string, a method as described herein, or another method. The SessionID is derived as the encryption of the hash digest of a secret of the producer ("secret"), the FSK, and an optional prefix (such as "Prefix3"). The encryption is performed based on a long-term secret key ("k1") owned by the producer which is used only for this purpose, i.e., the long-term secret key is not used for encrypting consumer traffic:

$$\text{SessionID}=\text{Enc}(k1, H(\text{secret} \mathbin{/\!/} \text{FSK} \mathbin{/\!/} (\text{Prefix3 } I\text{'}))) \quad (7)$$

The SS key and the FSK are the keys which enable correct session communication. Thus, the resumption cookie ("RC") used in the key exchange protocol described herein must be able to be used to recover the SS key and the FSK for a given session. The resumption cookie is derived as the encryption of the hash digest of a secret of the producer ("secret"), the SS key, the FSK, and the optional "(Prefix3, MoveToken)" tuple (if created for the session). The encryption is performed based on a long-term secret key ("k2") owned by the producer, which is used only for this purpose and not for encrypting consumer traffic:

$$RC=\text{Enc}(k2, SS \mathbin{/\!/} \text{FSK} \mathbin{/\!/} ((\text{Prefix3} \mathbin{/\!/} \text{MoveToken})I \text{ "})) \quad (8)$$

Note that it is possible, though not required, that k1 is equal to k2.

Role of Content-Consuming Device

Figure 3A:
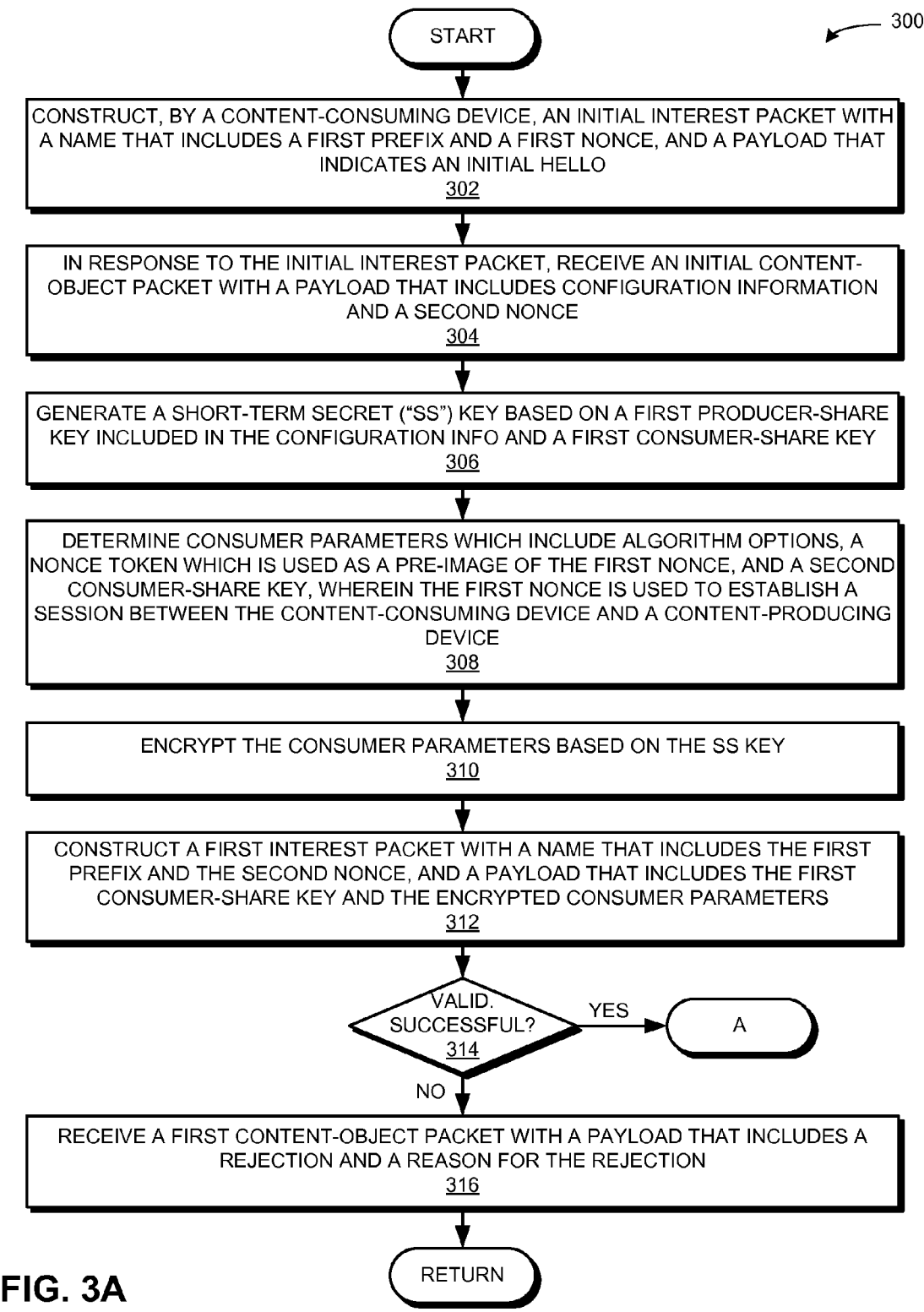
FIG. 3A presents a flow chart illustrating a method by a content-consuming device for facilitating secure communication with a content-producing device, in accordance with an embodiment of the present invention.

FIG. 3A presents a flow chart 300 illustrating a method by a content-consuming device for facilitating secure communication with a content-producing device, in accordance with an embodiment of the present invention. During operation, the system constructs, by a content-consuming device or a consumer, an initial interest packet with a name that includes a first prefix and a first nonce, and a payload that indicates an initial hello (operation 302). In response to the initial interest packet, the consumer receives an initial content-object packet with a payload that includes configuration information and a second nonce (operation 304). The payload can also include a producer salt, and the configuration information can include a first producer-share key. The second nonce is used to establish the session. The consumer generates a short-term secret ("SS") key based on the first producer-share key included in the configuration file and a first consumer-share key (operation 306). In some embodiments, the SS key is generated based on a hash-based key derivation function as described in RFC 5869. The consumer determines consumer parameters which include algorithm options, a nonce token which is used as a pre-image of the first nonce, and a second consumer-share key (operation 308). The first nonce is used to establish a session between the content-consuming device and a content-producing device. Algorithm options are described below in relation to FIG. 5C. The consumer then encrypts the consumer parameters based on the SS key (operation 310). The consumer constructs a first interest packet with a name that includes the first prefix and the second nonce, and a payload that includes the first consumer-share key and the encrypted consumer parameters (operation 312). If the nonce token and validation algorithms are successfully verified by the producer (decision 314), the operation continues as depicted at Label A of FIG. 3B. If not, the consumer receives a first content-object packet with a payload that includes a rejection and a reason for the rejection (operation 316).

Figure 3B:
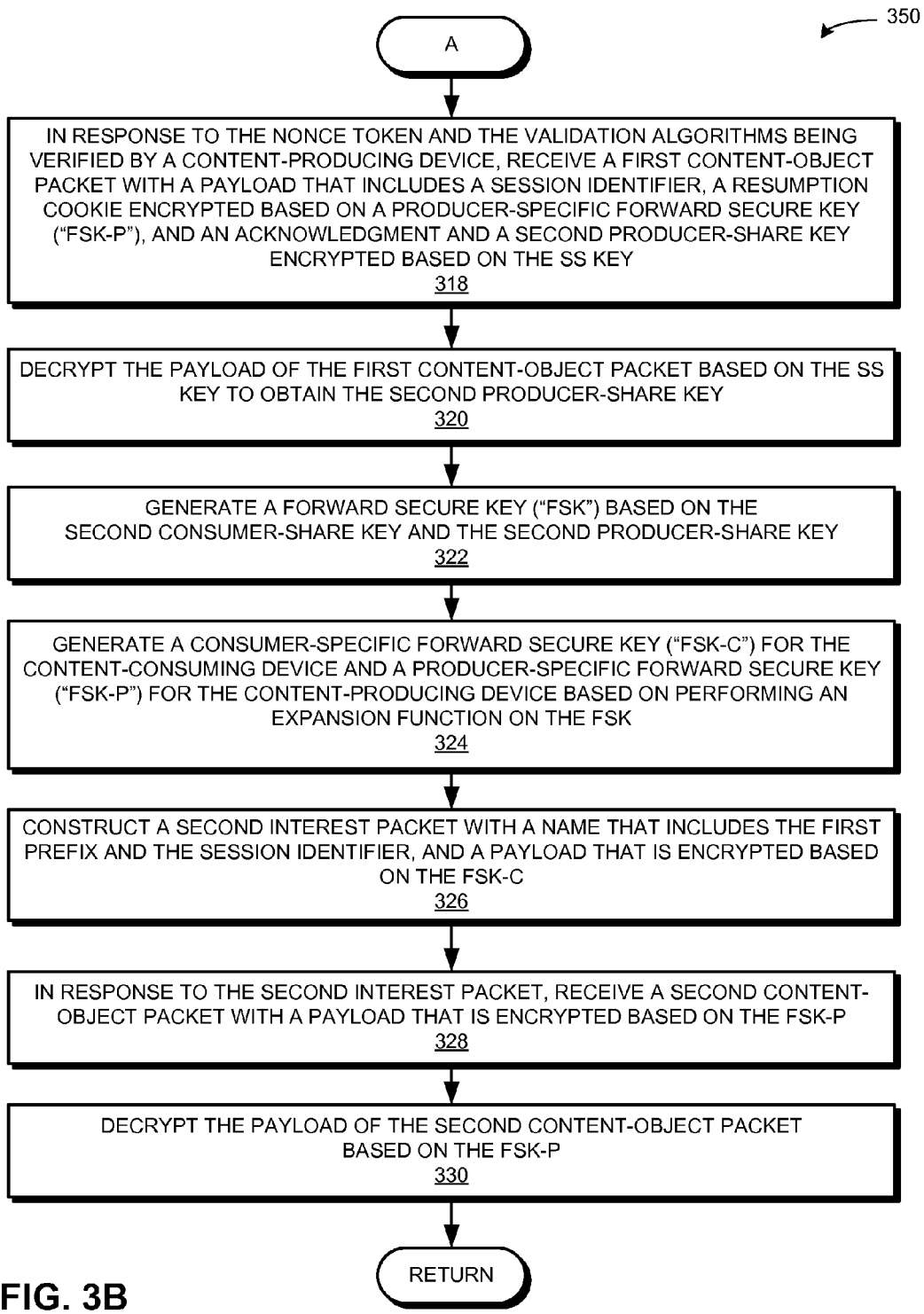
FIG. 3B presents a flow chart illustrating a method by a content-consuming device for facilitating secure communication with a content-producing device, in accordance with an embodiment of the present invention.

FIG. 3B presents a flow chart 350 illustrating a method by a content-consuming device for facilitating secure communication with a content-producing device, in accordance with an embodiment of the present invention. In response to the nonce token and the algorithm options being verified by the producer, the consumer receives a first content-object packet with a payload that includes a session identifier, a resumption cookie encrypted based on a producer-specific forward secure key (FSK-P), and an acknowledgment and a second producer-share key encrypted based on the SS key (operation 318). The consumer decrypts the payload of the first content-object packet based on the SS key to obtain the second producer-share key (operation 320). The consumer then generates a forward secure key (FSK) based on the second consumer-share key and the decrypted second producer-share key (operation 322). The consumer further generates a consumer-specific forward secure key (FSK-C) for the content-consuming device and a producer-specific forward secure key (FSK-P) for the content-producing device based on performing an expansion function on the forward secure key (operation 324). In some embodiments, the FSK is generated based on an HKDF, and the FSK-C and FSK-P are generated based on an HKDF-Expand function, which functions are described in RFC 5869.

Subsequently, the consumer constructs a second interest packet with a name that includes the first prefix and the session identifier, and a payload that is encrypted based on the FSK-C (operation 326). In response to the second interest packet, the consumer receives a second content-object packet with a payload that is encrypted based on the FSK-P (operation 328). Finally, the consumer decrypts the payload of the second content-object packet based on the FSK-P (operation 330).

In some embodiments (as described in relation to FIG. 2B), the payload for the initial content-object packet (as in operation 304) includes a second prefix that is different from the first prefix and indicates a redirection from the producer. The consumer replaces the first prefix with the second prefix in the name for the first interest packet, and also replaces the first prefix with the second prefix in the name for any subsequent interest packets associated with the session.

In some embodiments (as described in relation to FIG. 2C), in decrypting the payload of the first content-object packet to obtain the ACK and the second producer-share key (as in operation 320), the consumer also obtains a third prefix and a move token. The consumer replaces the first prefix with the third prefix in the name for the second interest packet (as in operation 326) and replaces the first prefix with the third prefix in the name for any subsequent interest packets associated with the session. Furthermore, the consumer indicates the move token in the payload for the second interest packet (as in operation 326).

In other embodiments (as described in relation to FIG. 2D), the payload for the received second content-object packet (as in operation 328) includes a new resumption cookie for a subsequently resumed session between the consumer and the producer, and the new resumption cookie is encrypted based on the FSK-P.

Role of Content-Producing Device

Figure 4A:
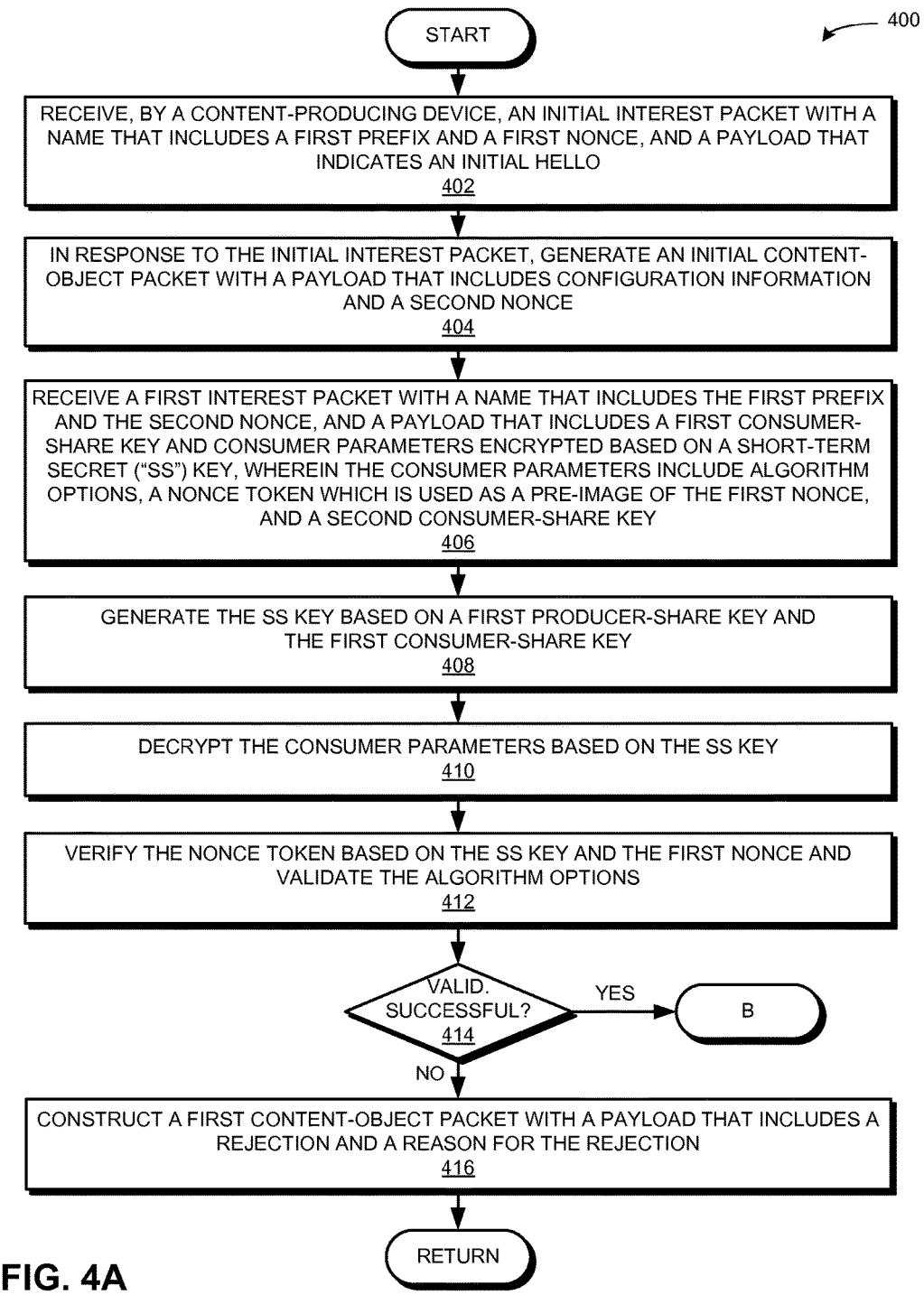
FIG. 4A presents a flow chart illustrating a method by a content-producing device for facilitating secure communication with a content-consuming device, in accordance with an embodiment of the present invention.

FIG. 4A presents a flow chart 400 illustrating a method by a content-producing device for facilitating secure communication with a content-consuming device, in accordance with an embodiment of the present invention. During operation, the system receives, by a content-producing device or a producer, an initial interest packet with a name that includes a first prefix and a first nonce, and a payload that indicates an initial hello (operation 402). In response to the initial interest packet, the producer generates an initial content-object packet with a payload that includes configuration information and a second nonce (operation 404). The configuration information indicates a first producer-share key, and the second nonce is used to establish a session between a consumer and the producer. The producer receives a first interest packet with a name that includes the first prefix and the second nonce, and a payload that includes a first consumer-share key and consumer parameters encrypted based on a short-term secret ("SS") key (operation 406). The consumer parameters include algorithm options, a nonce token which is used as a pre-image of the first nonce, and a second consumer-share key (operation 406).

The producer generates the SS key based on a first producer-share key and the first consumer-share key (operation 408). The first producer-share key is included in the configuration information and the SS key generation can be based on an HKDF function as described in RFC 5869. The producer decrypts the consumer parameters based on the SS key (operation 410), and obtains the nonce token and the second consumer-share key. The producer verifies the nonce token based on the SS key and the first nonce, and also validates the algorithm options (operation 412). In some embodiments, the producer performs a hash function on the nonce token and verifies that the result matches "nonce1": H(NonceToken)=nonce1. The algorithm options may be a list of tags echoed from the producer's configuration information, as described below in FIG. 5C.

The producer then determines whether the nonce verification and the algorithm validation are successful (decision 414). If so, the operation continues as depicted at Label B of FIG. 4B. If not, the producer constructs a first content-object packet with a payload that includes a rejection and a reason for the rejection (operation 416). The producer can transmit the first content-object packet to the consumer, and the operation returns.

Figure 4B:
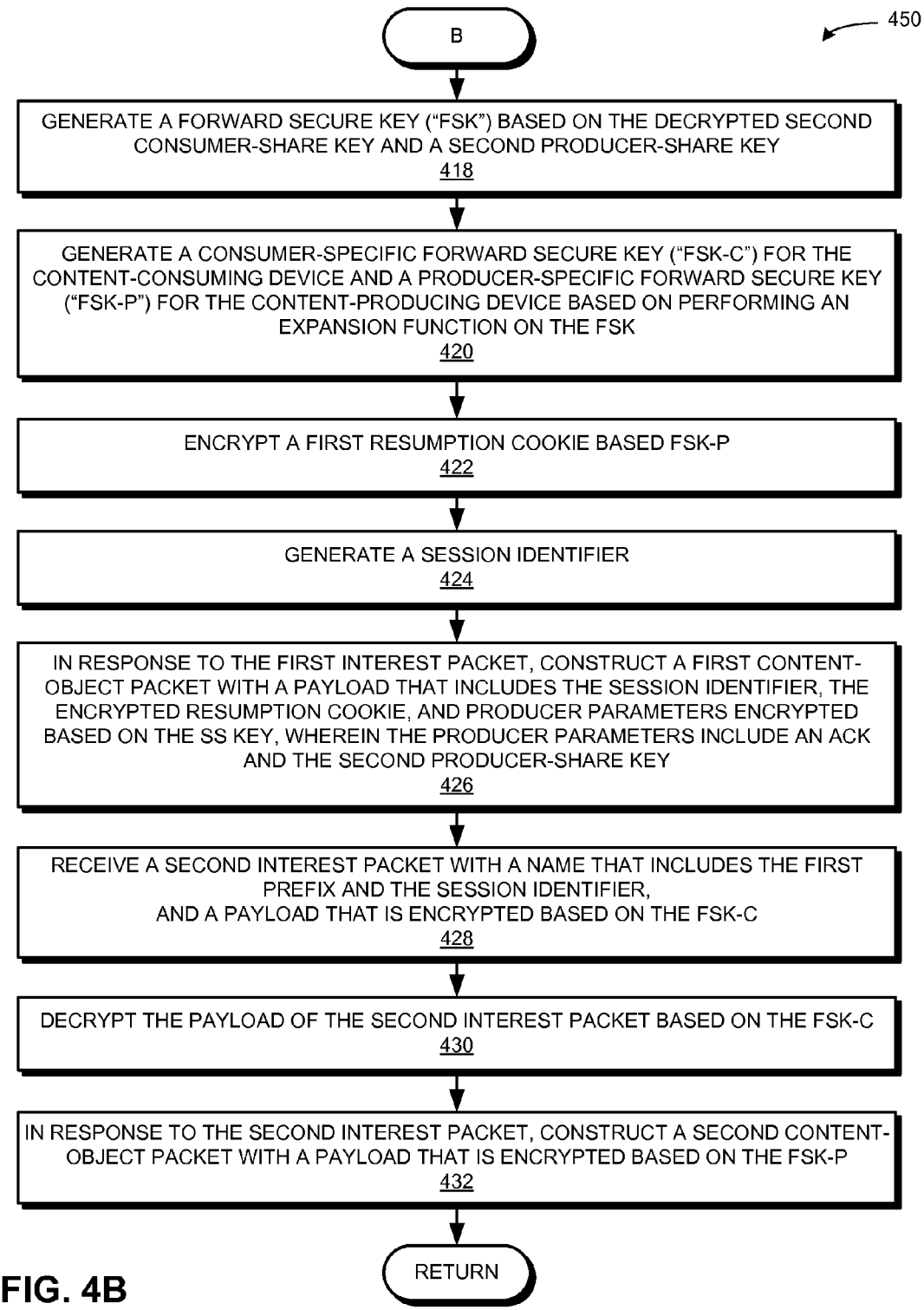
FIG. 4B presents a flow chart illustrating a method by a content-producing device for facilitating secure communication with a content-consuming device, in accordance with an embodiment of the present invention.

FIG. 4B presents a flow chart 450 illustrating a method by a content-producing device for facilitating secure communication with a content-consuming device, in accordance with an embodiment of the present invention. The producer generates a forward secure key (FSK) based on the decrypted second consumer-share key and the second producer-share key (operation 418). The producer further generates a consumer-specific forward secure key (FSK-C) for the content-consuming device and a producer-specific forward secure key (FSK-P) for the content-producing device by performing an expansion function on the forward secure key (operation 420). In some embodiments, the FSK is generated based on an HKDF, and the FSK-C and FSK-P are generated based on an HKDF-Expand function, which functions are described in RFC 5869.

The producer encrypts a first resumption cookie based on the FSK-P (operation 422) and generates a session identifier (operation 424). In response to the first interest packet, the producer constructs a first content-object packet with a payload that includes the session identifier, the encrypted resumption cookie, and producer parameters encrypted based on the SS key (operation 426). The producer parameters include an acknowledgment and the second producer-share key. Subsequently, the producer receives a second interest packet with a name that includes the first prefix and the session identifier, and a payload that is encrypted based on the FSK-C (operation 428). The producer decrypts the payload of the second interest packet based on the FSK-C (operation 430). In response to the second interest packet, the producer constructs a second content-object packet with a payload that is encrypted based on the FSK-P (operation 432).

In some embodiments (as described in relation to FIG. 2B), the payload for the initial content-object packet (as in operation 404) includes a second prefix that is different from the first prefix and indicates a redirection from the producer. The name for the first interest packet (as in operation 406) includes the second prefix, where the second prefix replaces the first prefix. In addition, a name for any subsequent interest packets associated with the session also includes the second prefix in place of the first prefix (as in operation 428).

In some embodiments (as described in relation to FIG. 2C), in addition to including the ACK and the second producer-share key in the payload of the first content-object packet (as in operation 426), the producer also includes a third prefix and a move token. The name for the second interest packet includes the third prefix in place of the first prefix, and the payload for the second interest packet includes the move token (as in operation 428). Additionally, the name for the second content-object packet also includes the third prefix (as in operation 432).

In other embodiments (as described in relation to FIG. 2D), the payload for the second content-object packet (as in operation 432) includes a new resumption cookie for a subsequently resumed session between the consumer and the producer, and the new resumption cookie is encrypted based on the FSK-P.

Exemplary Payload Formats

FIGS. 5A-5E illustrate exemplary payload formats for packets involved in the key exchange protocol described herein. Packet formats may be encoded based on a coding type agreed upon by the communicating CCN entities (e.g., the consumer and the producer). For example, the payload may be structured and encoded as a JavaScript Object Notation (JSON) object. FIG. 5A illustrates an exemplary payload format for an interest packet 500 that indicates an initial hello, in accordance with an embodiment of the present invention. Packet 500 can include a tag 502 field, a description 504 field, and an optional indicator 506 field that indicates whether the tag is optional. Packet 500 can include a CCS 502.1, a CCRT 502.2, a VER 502.3, a PROOF 502.4, and a NONCE1 502.5, with a corresponding description and optional indicator as shown.

FIG. 5B illustrates an exemplary payload format for a content-object packet 510 in response to an initial hello interest packet, in accordance with an embodiment of the present invention. Packet 510 can include a tag 512 field, a description 514 field, and an optional indicator 516 field that indicates whether the tag is optional. Packet 510 can include a REJ 512.1, a REASON 512.2, a CONFIG 512.3, a NONCE2 512.4, a PSALT1 512.5, and a PREFIX2 512.6, with a corresponding description and optional indicator as shown. As indicated by a note 511, "{x}" denotes a value encrypted with the SS key. Packet 510 can also be a content object packet generated or received in response to an unsuccessful validation of algorithm options and verification of the nonce token (as described in relation to decisions 314 of FIG. 3A and 414 of FIG. 4A).

FIG. 5C illustrates an exemplary format for a data structure 520 that indicates configuration information for a producer, in accordance with an embodiment of the present invention. Packet 520 can include a tag 522 field, a description 524 field, and an optional indicator 526 field that indicates whether the tag is optional. Packet 520 can include an SCID 522.1, a KEXS 522.2, an AEAD 522.3, a PUBS 522.4, an EXPRY 522.5, and a VER 522.6, with a corresponding description and optional indicator as shown.

The configuration information, as shown in data structure 520, is a semi-static catalog of information that consumers can use to complete future key exchanges with the producer. KEXS 522.2 is a data structure that enumerates the elliptic curve key-exchange algorithms supported by the producer, such as Curve25519 and P-256. Selection criteria for these curves is described at http://safecurves.cr.yp.to. AEAD 522.3 is a data structure that enumerates the supported Authenticated Encryption with Associated Data (AEAD) algorithms used for symmetric-key authenticated encryption after the session is established, such as AES-GCM-(128, 192,256) and Salsa20. AES-GCM is described in Dworkin, M., "Recommendation for Block Cipher Modes of Operation: Galois/Counter Mode (GSM) and GMAC," NIST Special Publication 800-38D, November 2007, and Salsa20 is described in Bernstein, D., "Salsa20 specification," at http://cr.yp.to.snuffle/spec.pdf. The configuration information provides the key sizes and related parameters with the AEAD tag. In addition, PUBS 522.4 is a data structure that contains the public values for the initial key exchange. Both Curve25519 and P-256 provide their own set of accepted parameters. Thus, the only values provided in the configuration information are the random curve elements used in the DH operation.

FIG. 5D illustrates an exemplary payload format for an interest packet 530 that indicates a full hello to establish a forward secure key for future communication, in accordance with an embodiment of the present invention. Packet 530 can include a tag 532 field, a description 534 field, and an optional indicator 536 field that indicates whether the tag is optional. Packet 530 can include a CLIENT-SHARE1 532.1, a CSALT1 532.2, a PSALT1 532.3, a PROOF 532.4, a CCS 532.5, a CHALLENGE 532.6, a CHOICE 532.7, a NONCE-TOKEN 532.8, a CLIENT-SHARE2 532.9, and a CSALT2 532.10, with a corresponding description and optional indicator as shown. As indicated by a note 531, "{x}" denotes a value encrypted with the SS key.

FIG. 5E illustrates an exemplary payload format for a content-object packet 540 in response to a full hello interest packet to establish a forward secure key for future communication, in accordance with an embodiment of the present invention. Packet 540 can include a tag 542 field, a description 544 field, and an optional indicator 546 field that indicates whether the tag is optional. Packet 540 can include a SessionID 542.1, an RC 542.2, an ACK 542.3, a RESPONSE 542.4, a PSALT2 542.5, a SERVER-SHARE2 542.6, and a (Prefix3, MoveToken) tuple 542.7, with a corresponding description and optional indicator as shown. As indicated by a note 541, "{x}" denotes a value encrypted with the SS key, and "[y]" denotes a value encrypted with the FSK.

Exemplary Computer Systems

Figure 6A:
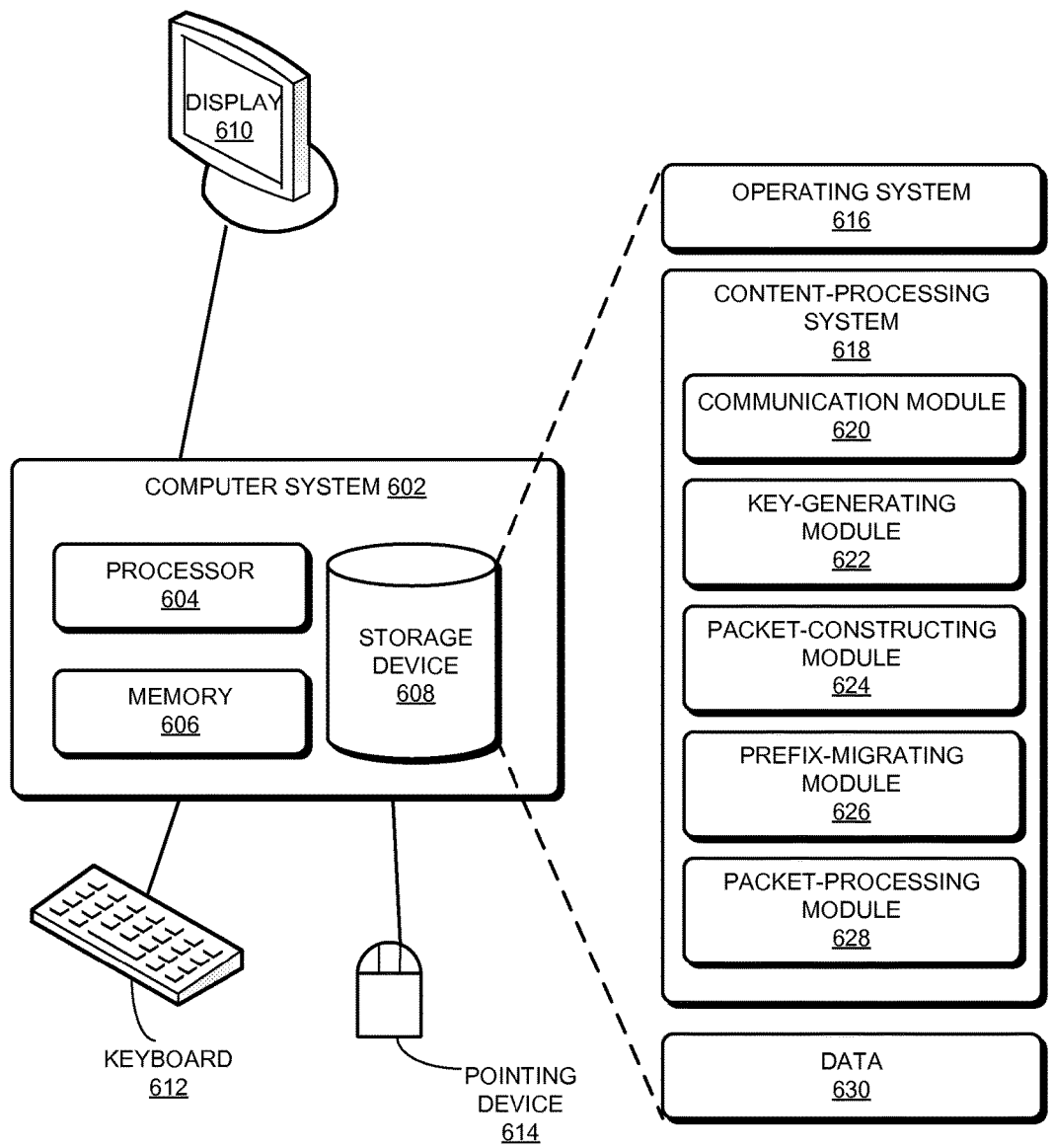
FIG. 6A illustrates an exemplary computer system that facilitates secure communication between computing entities in a content centric network, in accordance with an embodiment of the present invention.

FIG. 6A illustrates an exemplary computer system 602 that facilitates secure communication between computing entities in a content centric network, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 630.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network, where a data packet can correspond to an interest or a content-object packet with a name and a payload. Content-processing system 618 may include instructions for generating, by a content-consuming device, a first key based on a first consumer-share key and a previously received producer-share key (key-generating module 622). Content-processing system 618 may include instructions for constructing a first interest packet that includes the first consumer-share key and a nonce token which is used as a pre-image of a previously generated first nonce (packet-constructing module 624). Content-processing system 618 may include instructions for, in response to the nonce token being verified by the content-producing device, receiving a first content-object packet with a payload that includes a first resumption indicator encrypted based on a second key (communication module 620).

Content-processing system 618 can further include instructions for: generating the first key by performing a key derivation function based on the first consumer-share key and the first producer-share key; generating the second key by performing the derivation function based on the second consumer-share key and a second producer-share key indicated in the first content-object packet; and performing an expansion function based on the second key to generate an FSK-C, an FSK-P, an IV-C, and/or an IV-P (key-generating module 622).

Content-processing system 618 can additionally include instructions for constructing an initial interest packet with a name that includes the first prefix and the first nonce, and a payload that indicates an initial hello (packet-constructing module 624). Content-processing system 618 can include instructions for, in response to the initial interest packet, receiving an initial content-object packet with a payload that includes configuration information and the second nonce (communication module 620). Content-processing system 618 can include instructions for constructing a second interest packet with a name that includes a previously received session identifier, and a payload encrypted based on a consumer-specific second key (packet-constructing module 624). Content-processing system 618 can also include instructions for, in response to the second interest packet, receiving a second content-object packet with a payload encrypted based on a producer-specific second key (communication module 620). Content-processing system 618 can include instructions for decrypting the payload for the first content-object packet, and, in response to determining that the decrypted payload does not indicate a rejection, obtaining an acknowledgment and a second producer-share key (packet-processing module 628).

Content-processing system 618 can further include instructions for: replacing the first prefix with a second prefix in the name for the first interest packet and a name for a subsequent interest packet associated with the session; replacing the first prefix with a third prefix in the name for the second interest packet and a name for a subsequent interest packet associated with the session; and indicating the move token in the payload for the second interest packet (prefix-migrating module 626).

Figure 6B:
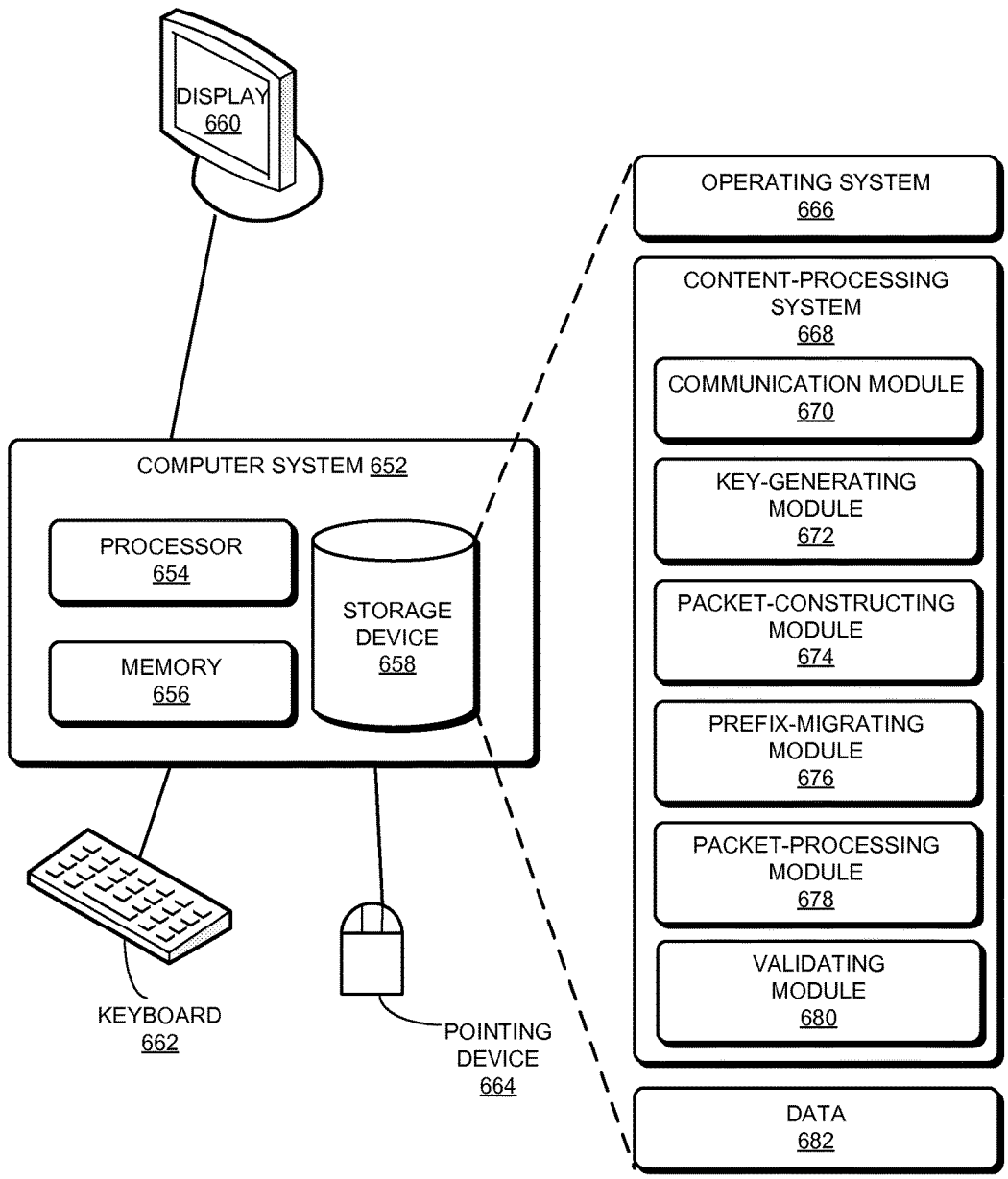
FIG. 6B illustrates an exemplary computer system that facilitates secure communication between computing entities in a content centric network, in accordance with an embodiment of the present invention.

FIG. 6B illustrates an exemplary computer system 652 that facilitates secure communication between computing entities in a content centric network, in accordance with an embodiment of the present invention. Computer system 652 includes a processor 654, a memory 656, and a storage device 658. Memory 656 can include a volatile memory (e.g., RAM) that serves as a managed memory, and can be used to store one or more memory pools. Furthermore, computer system 652 can be coupled to a display device 660, a keyboard 662, and a pointing device 664. Storage device 658 can store an operating system 666, a content-processing system 668, and data 682.

Content-processing system 668 can include instructions, which when executed by computer system 652, can cause computer system 652 to perform methods and/or processes described in this disclosure. Specifically, content-processing system 668 may include instructions for sending and/or receiving data packets to/from other network nodes across a computer network, such as a content centric network, where a data packet can correspond to an interest or a content-object packet with a name and a payload. Content-processing system 668 may include instructions for receiving, by a content-producing device, a first interest packet that includes a first consumer-share key and a nonce token which is used as a pre-image of a previously received first nonce (communication module 670). Content-processing system 668 can include instructions for generating a first key based on the first consumer-share key and a first producer-share key (key-generating module 672). Content-processing system 668 can also include instructions for verifying the nonce token based on the first key and the first nonce (validating module 680), and for generating a second key based on the first interest packet and a second producer-share key (key-generating module 672). Content-processing system 668 can further include instructions for constructing a first content-object packet with a payload that includes a first resumption indicator encrypted based on the second key (packet-constructing module 674).

Content-processing system 668 can further include instructions for: generating the first key by performing a key derivation function based on the first consumer-share key and the first producer-share key; generating the second key by performing the derivation function based on the second consumer-share key and a second producer-share key indicated in the first content-object packet; and performing an expansion function based on the second key to generate an FSK-C, an FSK-P, an IV-C, and/or an IV-P (key-generating module 672).

Content-processing system 668 can further include instructions for receiving an initial interest packet with a name that includes the first prefix and the first nonce, and a payload that indicates an initial hello (communication module 670), and, in response to the initial interest packet, constructing an initial content-object packet with a payload that includes configuration information and a second nonce (packet-constructing module 674). Content-processing system 668 can further include instructions for including in the payload for the initial content-object packet a second prefix that is different from the first prefix, and for indicating in the payload for the first content-object packet a move token and a third prefix different from the first prefix (prefix-migrating module 676).

Content-processing system 668 can additionally include instructions for generating a session identifier based on the second key (packet-constructing module 674) and for receiving a second interest packet with a name that includes the session identifier, and a payload encrypted based on a consumer-specific second key (communication module 670). Content-processing system 668 can include instructions for, in response to the second interest packet, constructing a second content-object packet with a payload encrypted based on a producer-specific second key (packet-constructing module 674). Content-processing system 668 can include instructions for, in response to identifying a need for a new resumption indicator, generating a new resumption indicator for use in a subsequently resumed session between the consumer and the producer, and for including in the payload for the second content-object packet the new resumption indicator encrypted based on the producer-specific second key (packet-constructing module 674). Content-processing system 668 can also include instructions for decrypting the payload for the first interest packet based on the first key (packet-processing module 678).

Content-processing system 668 can further include instructions for performing a hash function on the nonce token to obtain a result, and for verifying whether the result matches the first nonce (validating module 680). Content-processing system 668 can also include instructions for: in response to verifying that the result matches the first nonce, including in the payload for the first content-object packet an acknowledgment and the second producer-share key; and, in response to verifying that the result does not match the first nonce, including in the payload for the first content-object packet a rejection and a reason for the rejection (packet-processing module 678 and validating module 680).

Data 682 can include any data that is required as input or that is generated as output by the methods and/or processes described in this disclosure. Specifically, data 682 can store at least: an interest packet; a content-object packet; a first consumer-share key; a second consumer-share key; a producer configuration file or configuration information; a first producer-share key; a second producer-share key; a first short-term secret key based on the first consumer-share key and the first producer-share key; a second forward-secure key (FSK) based on the second consumer-share key and the second producer-share key; a first nonce; a second nonce; a nonce token which is a pre-image of the first nonce; a first resumption indicator; a second resumption indicator; a key derivation function; a key expansion function; algorithm options; one or more salts; an FSK-C; an FSK-P; an IV-C; an IV-P; at least three prefixes that are distinct from each other; a move token; an indicator of an acknowledgment or a rejection; a reason for the rejection; an indicator of an initial hello; a name; a hierarchically structured variable length identifier; and a payload.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system comprising:
a processor; and
a storage device storing instructions that when executed by the processor cause the processor to perform implementing a key exchange protocol to establish and exchange secure session keys for authenticated encryption of data for a secure communication session between a content-consuming device and a content-producing device each configured to exchange interest packets and content object packets over a content-centric network (CCN), the implementing including:
constructing an initial interest packet with a name that includes a first prefix and a previously generated first nonce, and a payload that indicates an initial hello;
in response to the initial interest packet, receiving an initial content-object packet with a payload that includes configuration information, a second nonce, and a second prefix different from the first prefix, wherein the configuration information indicates a first consumer-share key, and the second nonce is used to establish a session between the content-consuming device and the content-producing device over the CCN;
generating, by the content-consuming device, a first key based on the first consumer-share key and a previously received producer-share key;
constructing a first interest packet that includes the first consumer-share key and a nonce token which is used as a pre-image of the previously generated first nonce, wherein the first interest packet has a name that includes the first prefix, and wherein the previously generated first nonce is also used to establish the session;
replacing the first prefix with the second prefix in the name for the first interest packet;
sending the first interest packet to the content-producing device over the CCN and in response to the nonce token being verified by the content-producing device, receiving, by the content-consuming device, from the content-producing device over the CCN a first content-object packet with a payload that includes a first resumption indicator encrypted based on a second key;
generating the second key based on a second consumer-share key and the first content-object packet;
decrypting the payload for the first content-object packet; and
in response to determining that the decrypted payload does not indicate a rejection, obtaining an acknowledgment and a second producer-share key.

2. The computer system of claim 1, wherein the nonce token is verified based on the first key and the previously generated first nonce.

3. The computer system of claim 1, wherein:
generating the first key is further based on performing a key derivation function based on the first consumer-share key and the first producer-share key;
generating the second key is further based on performing the key derivation function based on the second consumer-share key and a second producer-share key indicated in the first content-object packet; and
the processor is further configured to perform generating, based on performing an expansion function based on the second key, one or more of the following:
a consumer-specific second key;
a producer-specific second key;
a consumer-specific initialization vector; and
a producer-specific initialization vector.

4. The computer system of claim 1, wherein the processor is further configured to perform:
constructing a second interest packet with a name that includes a previously received session identifier, and a payload encrypted based on a consumer-specific second key; and
in response to the second interest packet, receiving a second content-object packet with a payload encrypted based on a producer-specific second key, wherein the consumer-specific second key and the producer-specific second key are generated based on performing an expansion function on the second key.

5. The computer system of claim 4, wherein the payload for the first content-object packet indicates a move token and a third prefix different from the first prefix, and wherein the processor is further configured to perform:

replacing the first prefix with the third prefix in the name for the second interest packet and a name for a subsequent interest packet associated with the session; and
indicating the move token in the payload for the second interest packet.

6. The computer system of claim 4, wherein the payload for the second content-object packet includes a second resumption indicator for a subsequently resumed session between the consumer and the producer.

7. A computer system comprising:
a processor; and
a storage device storing instructions that when executed by the processor cause the processor to perform implementing a key exchange protocol to establish and exchange secure session keys for authenticated encryption of data for a secure communication session between a content-consuming device and a content-producing device each configured to exchange interest packets and content object packets over a content-centric network (CCN), the implementing including:
  upon receiving over the CCN, by the content-producing device, an initial interest packet with a name that includes a first prefix and a first nonce, and a payload that indicates an initial hello, constructing an initial content-object packet with a payload that includes configuration information, a second nonce, and a second prefix different from the first prefix, wherein the configuration information indicates a first consumer-share key, and the second nonce is used to establish a session between the content-consuming device and the content-producing device over the CCN;
  receiving over the CCN, by the content-producing device, a first interest packet from the content-consuming device, wherein the first interest packet includes the first consumer-share key and a nonce token which is used as a pre-image of the previously received first nonce, wherein the first interest packet has a name that includes the first prefix, and wherein the previously received first nonce is also used to establish the session;
  replacing the first prefix with the second prefix in the name for the first interest packet;
  generating a first key based on the first consumer-share key and a first producer-share key;
  verifying the nonce token based on the first key and the first nonce, by decrypting the payload for the first interest packet based on the first key, performing a hash function on the nonce token to obtain a result, and determining whether the result matches the first nonce;
  generating a second key based on the first interest packet and a second producer-share key; and
  constructing a first content-object packet with a payload that includes a first resumption indicator encrypted based on the second key.

8. The computer system of claim 7, wherein:
generating the first key is further based on performing a key derivation function based on the first consumer-share key and the first producer-share key;
generating the second key is further based on performing the key derivation function based on a second consumer-share key indicated in the first interest packet and the second producer-share key; and
the processor is further configured to perform generating, based on performing an expansion function based on the second key, one or more of the following:
  a consumer-specific second key;
  a producer-specific second key;
  a consumer-specific initialization vector; and
  a producer-specific initialization vector.

9. The computer system of claim 7, wherein the name for the first interest packet further includes a previously generated second nonce, wherein the second nonce is used to establish the session.

10. The computer system of claim 7, wherein the processor is further configured to perform:
generating a session identifier based on the second key;
receiving a second interest packet with a name that includes the session identifier, and a payload encrypted based on a consumer-specific second key; and
in response to the second interest packet, constructing a second content-object packet with a payload encrypted based on a producer-specific second key,
wherein the consumer-specific second key and the producer-specific second key are generated based on performing an expansion function on the second key.

11. The computer system of claim 10, wherein the processor is further configured to perform:
indicating in the payload for the first content-object packet a move token and a third prefix different from the first prefix,
wherein the name for the second interest packet includes the third prefix in place of the first prefix, and
wherein the payload for the second interest packet indicates the move token.

12. The computer system of claim 10, wherein the processor is further configured to perform:
in response to identifying a need for a new resumption indicator, generating a new resumption indicator for use in a subsequently resumed session between the consumer and the producer; and
including in the payload for the second content-object packet the new resumption indicator encrypted based on the producer-specific second key.

13. The computer system of claim 7, wherein the processor is further configured to perform:
in response to determining that the result matches the first nonce, including in the payload for the first content-object packet an acknowledgment and the second producer-share key; and
in response to determining that the result does not match the first nonce, including in the payload for the first content-object packet a rejection and a reason for the rejection.

14. One or more non-transitory computer readable storage media encoded with instructions that, when executed by a processor, cause the processor to perform operations comprising implementing a key exchange protocol to establish and exchange secure session keys for authenticated encryption of data for a secure communication session between a content-consuming device and a content-producing device each configured to exchange interest packets and content object packets over a content-centric network (CCN), the implementing including:
  constructing an initial interest packet with a name that includes a first prefix and a previously generated first nonce, and a payload that indicates an initial hello;
  in response to the initial interest packet, receiving an initial content-object packet with a payload that includes configuration information, a second nonce, and a second prefix different from the first prefix, wherein the configuration information indicates a first consumer-share key, and the second nonce is used to establish a session between the content-consuming device and the content-producing device over the CCN;

generating, by the content-consuming device, a first key based on the first consumer-share key and a previously received producer-share key;

constructing a first interest packet that includes the first consumer-share key and a nonce token which is used as a pre-image of the previously generated first nonce, wherein the first interest packet has a name that includes the first prefix, and wherein the previously generated first nonce is also used to establish the session;

replacing the first prefix with the second prefix in the name for the first interest packet;

sending the first interest packet to the content-producing device over the CCN and in response to the nonce token being verified by the content-producing device, receiving, by the content-consuming device, from the content-producing device over the CCN a first content-object packet with a payload that includes a first resumption indicator encrypted based on a second key;

generating the second key based on a second consumer-share key and the first content-object packet;

decrypting the payload for the first content-object packet; and in response to determining that the decrypted payload does not indicate a rejection, obtaining an acknowledgment and a second producer-share.

15. The computer system of claim 7, wherein the nonce token is verified based on the first key and the previously generated first nonce.

16. The non-transitory computer readable storage media of claim 14, wherein the nonce token is verified based on the first key and the previously generated first nonce.

17. The non-transitory computer readable storage media of claim 14, wherein:

generating the first key is further based on performing a key derivation function based on the first consumer-share key and the producer-share key;

generating the second key is further based on performing the key derivation function based on the second consumer-share key and a second producer-share key indicated in the first content-object packet; and the implementing further includes generating, based on performing an expansion function based on the second key, one or more of the following:
   a consumer-specific second key;
   a producer-specific second key;
   a consumer-specific initialization vector; and
   a producer-specific initialization vector.

18. The non-transitory computer readable storage media of claim 14, wherein the implementing further includes:

constructing a second interest packet with a name that includes a previously received session identifier, and a payload encrypted based on a consumer-specific second key; and in response to the second interest packet, receiving a second content-object packet with a payload encrypted based on a producer-specific second key, wherein the consumer-specific second key and the producer-specific second key are generated based on performing an expansion function on the second key.

19. The non-transitory computer readable storage media of claim 18, wherein the payload for the first content-object packet indicates a move token and a third prefix different from the first prefix, and wherein the implementing further includes:

replacing the first prefix with the third prefix in the name for the second interest packet and a name for a subsequent interest packet associated with the session; and indicating the move token in the payload for the second interest packet.

20. The non-transitory computer readable storage media of claim 18, wherein the payload for the second content-object packet includes a second resumption indicator for a subsequently resumed session between the consumer and the producer.

* * * * *

UNITED STATES PATENT AND TRADEMARK OFFICE
CERTIFICATE OF CORRECTION

PATENT NO.           : 10,129,230 B2                                   Page 1 of 1
APPLICATION NO.      : 15/690485
DATED                : November 13, 2018
INVENTOR(S)          : Christopher A. Wood et al.

It is certified that error appears in the above-identified patent and that said Letters Patent is hereby corrected as shown below:

In the Claims

Claim 3, Column 20, Line 40, remove "first"

Claim 14, Column 23, Line 28, replace "producer-share." with --producer-share key.--

Signed and Sealed this
Twenty-ninth Day of January, 2019

Andrei Iancu
*Director of the United States Patent and Trademark Office*